United States Patent
Yamafuku et al.

(10) Patent No.: US 12,300,791 B2
(45) Date of Patent: May 13, 2025

(54) METHOD FOR MANUFACTURING ENERGY STORAGE DEVICE, AND ENERGY STORAGE DEVICE

(71) Applicant: GS Yuasa International Ltd., Kyoto (JP)

(72) Inventors: Taro Yamafuku, Kyoto (JP); Kenta Nakai, Kyoto (JP); Jun Oyama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 855 days.

(21) Appl. No.: 17/279,134

(22) PCT Filed: Sep. 26, 2019

(86) PCT No.: PCT/JP2019/038033
§ 371 (c)(1),
(2) Date: Mar. 24, 2021

(87) PCT Pub. No.: WO2020/067375
PCT Pub. Date: Apr. 2, 2020

(65) Prior Publication Data
US 2021/0399347 A1    Dec. 23, 2021

(30) Foreign Application Priority Data
Sep. 26, 2018 (JP) ................. 2018-180383

(51) Int. Cl.
*H01M 10/0587* (2010.01)
*H01G 11/22* (2013.01)
(Continued)

(52) U.S. Cl.
CPC ........ *H01M 10/0587* (2013.01); *H01G 11/22* (2013.01); *H01G 11/52* (2013.01); *H01G 11/58* (2013.01); *H01G 11/84* (2013.01)

(58) Field of Classification Search
CPC ... H01M 10/0587; H01G 11/22; H01G 11/52; H01G 11/58; H01G 11/84
(Continued)

(56) References Cited

U.S. PATENT DOCUMENTS

2006/0110660 A1    5/2006   Satou et al.
2010/0221587 A1    9/2010   Yanagita et al.
(Continued)

FOREIGN PATENT DOCUMENTS

JP    2006-156330 A    6/2006
JP    2008-098361 A    4/2008
(Continued)

OTHER PUBLICATIONS

International Search Report (ISR) dated Nov. 19, 2019 filed in PCT/JP2019/038033.

*Primary Examiner* — Jonathan G Jelsma
*Assistant Examiner* — Omar M Kekia
(74) *Attorney, Agent, or Firm* — RANKIN, HILL & CLARK LLP

(57) ABSTRACT

Provided is a method for manufacturing an energy storage device including an electrode that has an active material layer, an electrolyte solution, and a case. According to the present embodiment, the method including injecting an electrolyte solution in a predetermined amount into a case is characterized in that the predetermined amount is an amount such that, an alkali metal or an alkaline earth metal at least partially comes into contact with a free electrolyte solution that is the electrolyte solution excluding the electrolyte solution soaking into the electrode assembly in the case, with the case housing therein: the alkali metal or the alkaline earth metal of an ion supply member that has the alkali metal or the alkaline earth metal disposed on a conductive member other than the active material layer; and an electrode assem- (Continued)

bly including the stacked electrode that has electrical conduction to the conducive member of the ion supply member.

14 Claims, 17 Drawing Sheets

(51) Int. Cl.
    *H01G 11/52*     (2013.01)
    *H01G 11/58*     (2013.01)
    *H01G 11/84*     (2013.01)

(58) Field of Classification Search
    USPC ........................................... 429/94, 95
    See application file for complete search history.

(56) References Cited

U.S. PATENT DOCUMENTS

| | | | |
|---|---|---|---|
| 2013/0295416 A1 | 11/2013 | Guen | |
| 2015/0325885 A1* | 11/2015 | Nansaka | H01M 10/0587 29/25.03 |
| 2017/0155167 A1* | 6/2017 | Abe | H01M 10/0525 |
| 2018/0108494 A1 | 4/2018 | Takahashi et al. | |
| 2018/0248168 A1 | 8/2018 | Yokoshima et al. | |
| 2020/0066459 A1 | 2/2020 | Yokoshima et al. | |

FOREIGN PATENT DOCUMENTS

| | | | |
|---|---|---|---|
| JP | 2009-187753 A | 8/2009 | |
| JP | 2010-161244 A | 7/2010 | |
| JP | 2010-205769 A | 9/2010 | |
| JP | 2013-229473 A | 11/2013 | |
| JP | 2013-235831 A | 11/2013 | |
| JP | 2017-199510 A | 11/2017 | |
| JP | 2017-208177 A | 11/2017 | |
| JP | 2018-067595 A | 4/2018 | |
| JP | 2018-120811 A | 8/2018 | |
| JP | 2018-142604 A | 9/2018 | |
| JP | 2018-142605 A | 9/2018 | |
| JP | 2018-142607 A | 9/2018 | |
| JP | 2019-079645 A | 5/2019 | |
| WO | 2014/091957 | 6/2014 | |

* cited by examiner

METHOD FOR MANUFACTURING ENERGY STORAGE DEVICE, AND ENERGY STORAGE DEVICE

TECHNICAL FIELD

The present invention relates to a method for manufacturing an energy storage device including an electrode assembly that has electrodes stacked, and the energy storage device.

BACKGROUND ART

Conventionally, techniques for aiming at increasing the capacity by reducing the initial irreversible capacity have been known in energy storage devices such as a lithium ion battery (see Patent Document 1). This energy storage device includes, as shown in FIGS. 16 and 17, a long electrode sheet group 101 and a container 106 that houses therein the electrode sheet group rolled.

The electrode sheet group 101 is composed of a positive electrode sheets 102 and a negative electrode sheet 103 alternatively stacked. A lithium electrode sheet 104 is stacked on the electrode sheet group 101. Furthermore, the electrode sheet group 101 has separators 105 provided between the positive electrode sheet 102 and each of the negative electrode sheet 103 and the lithium electrode sheet 104. The electrode sheet group 101 and the lithium electrode sheet 104 are wound from one end and housed in the container 106, thereby constituting the energy storage device 100.

The positive electrode sheet 102 constituting a positive electrode is provided for each of one and the other (upper and lower in FIG. 16) outermost layers of the electrode sheet group 101. The positive electrode sheet 102 is composed of a positive electrode current collector 1021 and a positive composite layer 1022 applied on one side of the positive electrode current collector 1021. The negative electrode sheet 103 constituting a negative electrode is provided between the positive electrode sheets 102. The negative electrode sheet 103 is composed of a negative electrode current collector 1031 and a negative composite layer 1032 applied on both sides of the negative electrode current collector 1031. The lithium electrode sheet 104 stacked on the electrode sheet group 101 is composed of a lithium electrode current collector 1041 and a metallic lithium foil 1042 provided on both sides of the lithium electrode current collector 1041. Further, the positive composite layer 1022 of the positive electrode sheet 102 is applied on the side opposed to the negative electrode sheet 103. Thus, the positive composite layer 1022 and the negative composite layer 1032 are opposed to each other with the separator 105 interposed therebetween.

In the foregoing process for manufacturing the energy storage device 100, an electrolyte solution is injected into the container 106, thereby causing the electrolyte solution to soak into the separators 105, and the metallic lithium foil 1042 of the lithium electrode sheet 104 is dissolved in the electrolyte solution soaking in the separator 105, thereby starting the supply of lithium (hereinafter referred to as precharge) to the negative composite layer 1032 of the negative electrode sheet 103.

The separator 105 is, however, merely impregnated with the electrolyte solution, thereby insufficiently achieving the dissolution rate of the metallic lithium foil 1042 of the lithium electrode sheet 104 in the electrolyte solution, and thus, time is required for the supply of lithium (precharge) to the negative composite layer 1032 of the negative electrode sheet 103.

PRIOR ART DOCUMENT

Patent Document

Patent Document 1: JP-A-2010-205769

SUMMARY OF THE INVENTION

Problems to be Solved by the Invention

Accordingly, an object of the present embodiment is to provide a method for manufacturing an energy storage device in which an alkali metal or an alkaline earth metal for use in precharge is quickly dissolved, and the energy storage device.

Means for Solving the Problems

The method for manufacturing an energy storage device according to the present embodiment is a method for manufacturing an energy storage device including an electrode that has an active material layer, an electrolyte solution, and a case.

The method includes:
injecting an electrolyte solution in a predetermined amount into a case,
the predetermined amount is an amount such that an alkali metal or an alkaline earth metal at least partially comes into contact with a free electrolyte solution that is the electrolyte solution excluding the electrolyte solution soaking into the electrode assembly in the case, with the case housing therein: the alkali metal or the alkaline earth metal of an ion supply member that has the alkali metal or the alkaline earth metal disposed on a conductive member other than the active material layer; and an electrode assembly including the stacked electrode that has electrical conduction to the conducive member of the ion supply member.

In accordance with such an organization, the alkali metal or the alkaline earth metal is at least partially immersed in the free electrolyte solution, with electrical conduction to the electrode through the conductive member in the case, thus quickly dissolving the alkali metal or the alkaline earth metal in the free electrolyte solution (electrolyte solution).

In the method for manufacturing an energy storage device,
the ion supply member may be disposed outside the outermost electrode of the electrode assembly in the stacking direction.

In accordance with such a configuration, in the manufactured energy storage device, performance can be prevented from being degraded by the decreased area of the electrodes opposed to each other due to the ion supply member disposed between the electrodes.

Furthermore, the method for manufacturing an energy storage device may include:
leaving the case with the free electrolyte solution in the case,
the electrode assembly may at least partially have electrodes stacked, and
the predetermined amount may be an amount such that all layers of the electrodes stacked at least partially come into contact with the free electrolyte solution during the leaving.

In accordance with such an organization, in the case during leaving, all of the layers of the electrodes stacked (electrodes or sites electrodes) at least partially come into contact with the free electrolyte solution, thus supplying the alkali metal or alkaline earth metal (metal ions) dissolved in the free electrolyte solution to the respective layers (electrodes or sites electrodes) through the free electrolyte solution, and thus efficiently precharging the electrodes.

In the method for manufacturing an energy storage device, the electrode assembly may have a negative electrode as the electrode, a positive electrode, and a separator disposed between the positive electrode and the negative electrode. The negative electrode may have a conductive foil and a negative active material layer laminated on the foil. The ion supply member may have the conductive member, and a metal layer containing the alkali metal or the alkaline earth metal, disposed on the conductive member. The ion supply member may have a stacked part with the metal layer stacked and a non-stacked part without the metal layer stacked. The non-stacked part of the ion supply member may have electrical conduction to the foil of the negative electrode, with the metal layer opposed to the negative active material layer with the separator interposed therebetween.

In the method for manufacturing an energy storage device, for the electrode assembly, the positive electrode and the negative electrode may be wound with the separator interposed therebetween. The separator may be wound and stacked at the outermost periphery of the electrode assembly. The ion supply member may have the staked part disposed between the separators wound and stacked at the outermost periphery of the electrode assembly.

In the method for manufacturing an energy storage device, the negative active material layer may be laminated on both surfaces of the foil of the negative electrode. For the electrode assembly, the outermost peripheral site of the negative electrode may be disposed outside the outermost peripheral site of the positive electrode.

In the method for manufacturing an energy storage device, the ion supply member may be disposed at a curved site of the electrode assembly.

Advantages of the Invention

As described above, according to the present embodiment, a method for manufacturing an energy storage device in which an alkali metal or an alkaline earth metal for use in precharge is quickly dissolved can be provided.

MODE FOR CARRYING OUT THE INVENTION

Figure 1:
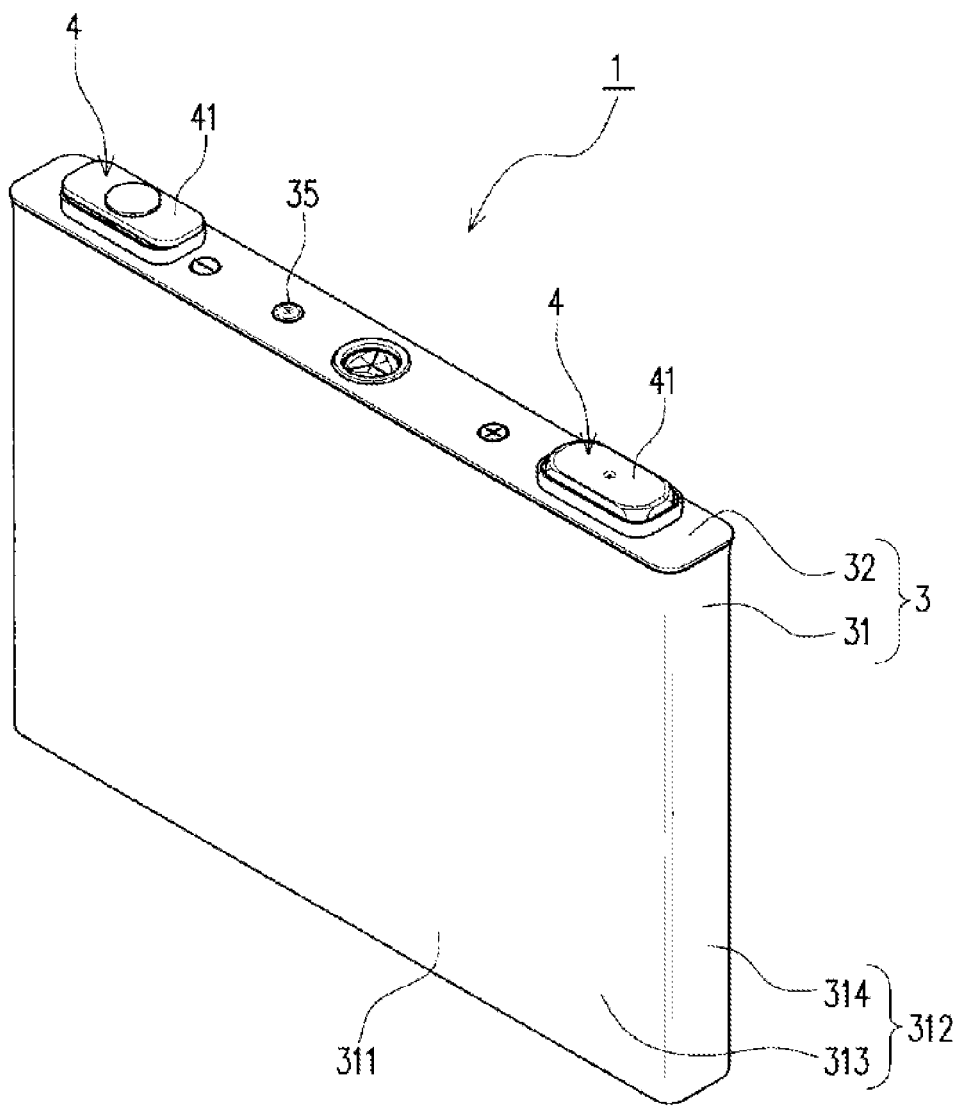
FIG. 1 is a perspective view of an energy storage device according to the present embodiment.
Figure 1:
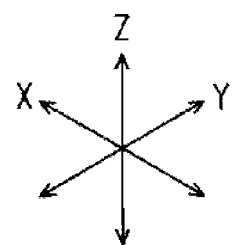

Hereinafter, an embodiment of the method for manufacturing an energy storage device according to the present invention will be described with reference to FIGS. 1 to 9. The energy storage device manufactured by the manufacturing method according to the present embodiment encompasses a primary battery, a secondary battery, and a capacitor. In the present embodiment, a rechargeable secondary battery will be described as an example of the energy storage device. Hereinafter, the configuration of the energy storage device manufactured by the manufacturing method according to the present embodiment will be described, and thereafter, the method for manufacturing the energy storage device will be described. It is to be noted that the respective constituent members (respective constituent elements) according to the present embodiment have names in accordance with the present embodiment, and may differ from the names of the respective constituent members (respective constituent element) in the background technology. In the following drawings, members/sites that perform the same action are described with the same reference numeral assigned.

The energy storage device manufactured by the manufacturing method according to the present embodiment is a nonaqueous electrolyte secondary battery. More specifically, the energy storage device is a lithium ion secondary battery that utilizes the electron transfer caused with the movement of lithium ions. This type of energy storage device supplies electrical energy. The energy storage device may be used alone, or more than one energy storage device is used. Specifically, the energy storage device is used alone in the case where the required power and the required voltage are low. In contrast, in the case where at least one of the required power and the required voltage is high, the energy storage device is used in combination with another energy storage device for an energy storage apparatus. In the energy storage apparatus, the energy storage devices used in the power storage device supply electrical energy.

Figure 2:
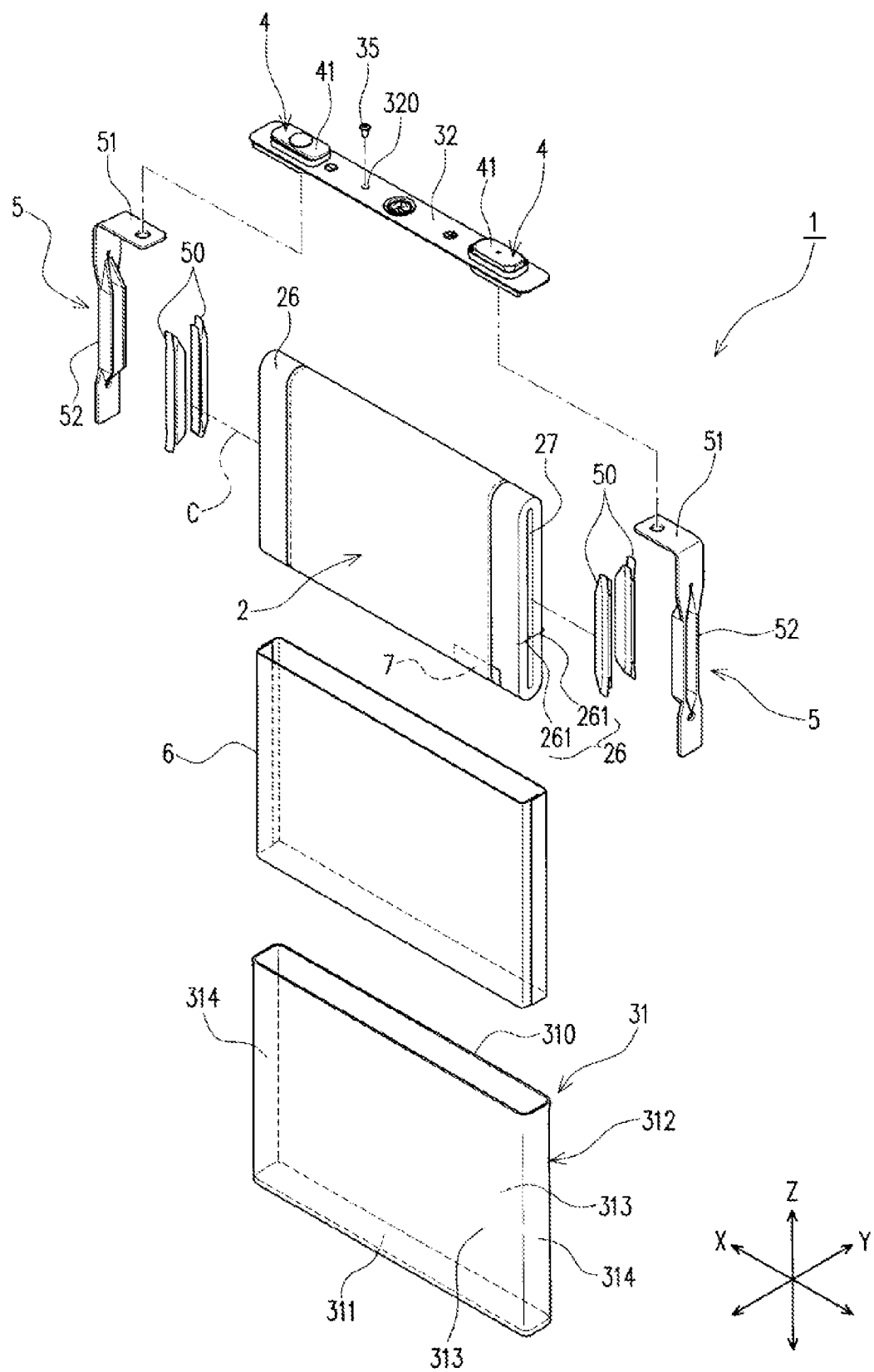
FIG. 2 is an exploded perspective view of the energy storage device.

The energy storage device includes, as shown in FIGS. 1 and 2, an electrode assembly 2, a case 3 that houses the electrode assembly 2 together with an electrolyte solution, an external terminal 4 that has at least a part exposed to the outside, and a current collector 5 that connects the electrode assembly 2 to the external terminal 4. This energy storage device 1 also includes an ion supply member 7 that supplies metal ions to the electrode assembly 2. Furthermore, the energy storage device 1 also includes an insulating member 6 or the like disposed between the electrode assembly 2 and the case 3.

The electrolyte solution is a nonaqueous solution-based electrolyte solution. This electrolyte solution is obtained by dissolving an electrolyte salt in an organic solvent. The organic solvent may be, for example, cyclic carbonates such as a propylene carbonate and an ethylene carbonate, and chain carbonates such as a dimethyl carbonate, a diethyl carbonate, and an ethyl methyl carbonate. The electrolyte salt is $LiClO_4$, $LiBF_1$, $LiPF_6$, or the like. The electrolyte solution according to the present embodiment has 1 mol/L $LiPF_6$ dissolved in a mixed solvent obtained by adjusting the proportions of a propylene carbonate, a dimethyl carbonate, and an ethyl methyl carbonate to meet propylene carbonate:dimethyl carbonate:ethyl methyl carbonate=3:2:5.

Figure 3:
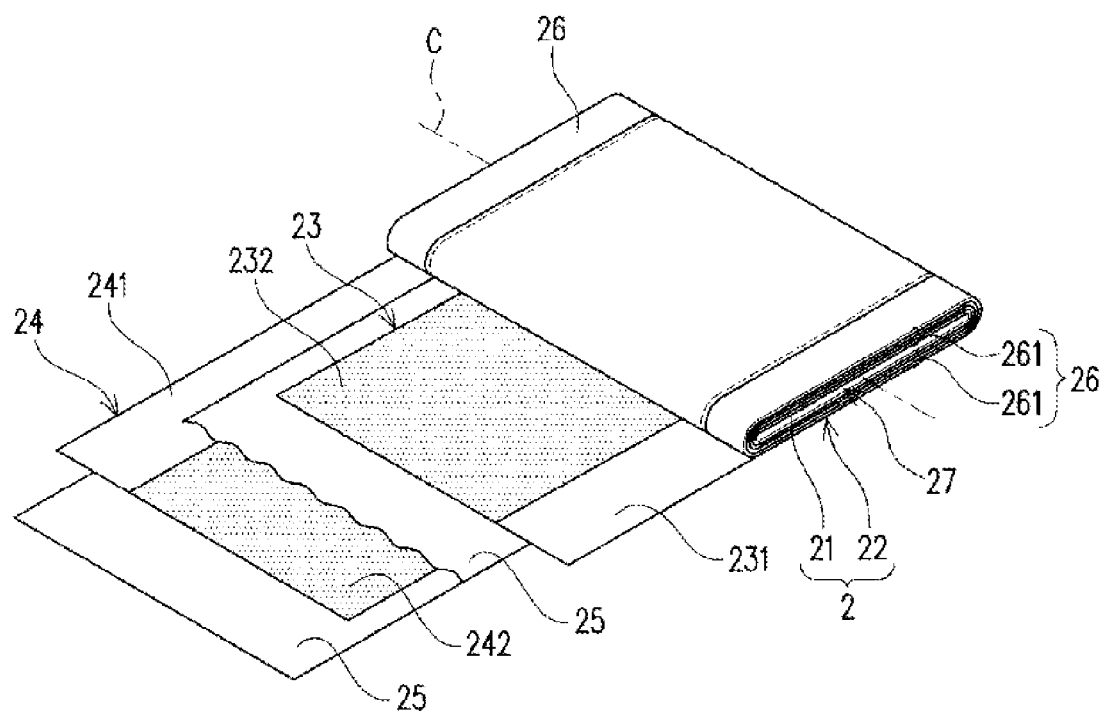
FIG. 3 is a perspective view illustrating the configuration of an electrode assembly included in the energy storage device.
Figure 3:
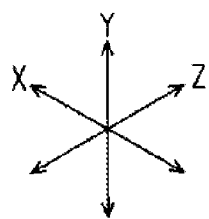

The electrode assembly 2 has, as also shown in FIG. 3, electrodes 23 and 24 stacked. For the electrode assembly 2 according to the present embodiment, the electrodes 23 and 24 are stacked by winding the electrodes (positive electrode 23 and negative electrode 24) around a winding shaft C extending in a predetermined direction. Specifically, the electrode assembly 2 includes a winding core 21 and a layered product 22 in which the positive electrode 23 and the negative electrode 24 are stacked to be insulated from each other and wound around the winding core 21. Lithium ions move between the positive electrode 23 and the negative electrode 24 in the electrode assembly 2, thereby charging and discharging the energy storage device 1. The electrode assembly 2 according to the present embodiment has a separator 25 disposed between the positive electrode 23 and the negative electrode 24. In the electrode assembly 2, the positive electrode 23 and the negative electrode 24 are wound to be insulated by the separator 25. More specifically, the layered product 22 on with the positive electrode 23, negative electrode 24, and separator 25 stacked is wound in the electrode assembly 2 according to the present embodiment.

The winding core 21 is typically formed from an insulating material. The winding core 21 according to the present embodiment has a flattened tubular shape. The winding core 21 is formed by winding a sheet that has flexibility or thermoplasticity. The sheet according to the present embodiment is formed from a synthetic resin. It is to be noted that the winding core 21 is not limited to a hollow tubular shape, and may be solid. Alternatively, the electrode assembly 2 may have a configuration without the winding core 21.

For the positive electrode 23, a positive active material layer 232 is laminated on a conductive foil 231. The conductive foil 231 in the positive electrode 23 according to the present embodiment is a metal foil. Specifically, the positive electrode 23 has a strip-shaped metal foil 231 and a positive active material layer 232 laminated on both sides of the metal foil 231. The positive active material layer 232 is laminated on each side of the metal foil 231, in such a manner to expose one end edge (uncoated part) of the metal foil 231 in the width direction. The metal foil 231 according to the present embodiment is, for example, an aluminum foil.

The positive active material layer 232 has a positive active material and a binder.

The positive active material according to the present embodiment is, for example, a lithium metal oxide. Specifically, the positive active material is, for example, a composite oxide represented by LiaMebOc (Me represents one, or two or more transition metals) ($LiaCoyO_2$, $LiaNixO_2$, $LiaMnzO_4$, $LiaNixCoyMnzO_2$, etc.), or a polyanionic compound represented by LiaMeb(XOc)d (Me represents one, or two or more transition metals, and X represents, for example, P, Si, B, or V) ($LiaFebPO_4$, $LiaMnbPO_4$, $LiaMnbSiO_4$, $LiaCobPO_4F$, etc.). The positive active material according to the present embodiment is $LiNi_{1/3}Co_{1/3}Mn_{1/3}O_2$.

The binder used for the positive active material layer 232 is, for example, a polyvinylidene fluoride (PVdF), a copolymer of ethylene and vinyl alcohol, a polymethylmethacrylate, a polyethylene oxide, a polypropylene oxide, a polyvinyl alcohol, a polyacrylic acid, polymethacrylic acid, or a styrene-butadiene rubber (SBR). The binder according to the present embodiment is polyvinylidene fluoride.

The positive active material layer 232 may further have a conductive auxiliary agent such as ketjen black (registered trademark), acetylene black, and graphite. The positive active material layer 232 according to the present embodiment has acetylene black as a conductive auxiliary agent.

For the negative electrode 24, a negative active material layer 242 is laminated on a conductive foil 241. The conductive foil 241 in the negative electrode 24 according to the present embodiment is a metal foil. Specifically, the negative electrode 24 has a strip-shaped metal foil 241 and a negative active material layer 249 laminated on both sides of the metal foil 241. The negative active material layer 242 is laminated on each side of the metal foil 241, in such a manner to expose the other (on the side opposite to the uncoated part of the metal foil 231 of the positive electrode 23) end edge (uncoated part) of the metal foil 241 in the width direction. The metal foil 241 according to the present embodiment is, for example, a copper foil.

The negative active material layer 242 has a negative active material and a binder.

The negative active material is, for example, a carbon material such as graphite, non-graphitizable carbon, and graphitizable carbon, or a material that undergoes an alloying reaction with lithium ions, such as silicon (Si) and tin (Sn). The negative active material according to the present embodiment is non-graphitizable carbon.

The binder used for the negative active material layer 242 is the same as the binder used for the positive active material layer 232. The binder according to the present embodiment is polyvinylidene fluoride.

The negative active material layer 242 may further have a conductive auxiliary agent such as ketjen black (registered trademark), acetylene black, and graphite. The negative active material layer 242 according to the present embodiment has no conductive auxiliary agent.

The separator 25 is a member that has an insulating property, and is disposed between the positive electrode 23 and the negative electrode 24. Thus, in the electrode assembly 2 (specifically, the layered product 22), the positive electrode 23 and the negative electrode 24 are insulated from each other. It is to be noted that there is no need for the insulation between the positive electrode 23 and the negative electrode 24 to be achieved by the separator 25, and the insulation may be achieved, for example, by an insulating layer applied to the surfaces of the electrodes 23 and 24 (onto the active material layers 232 and 242).

Furthermore, the separator 25 holds the electrolyte solution in the case 3. This allows lithium ions to move between the positive electrode 23 and the negative electrode 24 alternately stacked with the separator 25 in between, when the energy storage device 1 is charged and discharged.

The separator 25 is strip-shaped, and composed of, for example, a porous membrane such as polyethylene, polypropylene, cellulose, or polyamide. The separator 25 according to the present embodiment is formed by providing an inorganic layer including inorganic particles such as $SiO_2$ particles, $Al_2O_3$ particles, and boehmite (alumina hydrate) on a substrate formed from a porous film. The substrate of the separator 25 according to the present embodiment is formed from, for example, polyethylene.

The dimension of the separator 25 in the width direction is larger than the width of the negative active material layer 242. The separator 25 is disposed between the positive electrode 23 and the negative electrode 24 overlapped with each other to be displaced in width direction, such that the positive active material layer 232 and the negative active material layer 242 are overlapped in the thickness direction (stacking direction). In this regard, the uncoated part of the positive electrode 23 and the uncoated part of the negative electrode 24 have no overlap with each other. More specifically, the uncoated part of the positive electrode 23 protrudes from the overlapped region between the positive electrode 23 and the negative electrode 24 in the width direction (direction orthogonal to the stacking direction), whereas the uncoated part of the negative electrode 24 protrudes from the overlapped region between the positive electrode 23 and the negative electrode 24 in the width direction (the direction opposite to the protruding direction of the uncoated part of the positive electrode 23). The electrode assembly 2 is formed by winding the thus stacked positive electrode 23, negative electrode 24, and separator 25 (that is, the layered product 22).

Figure 4:
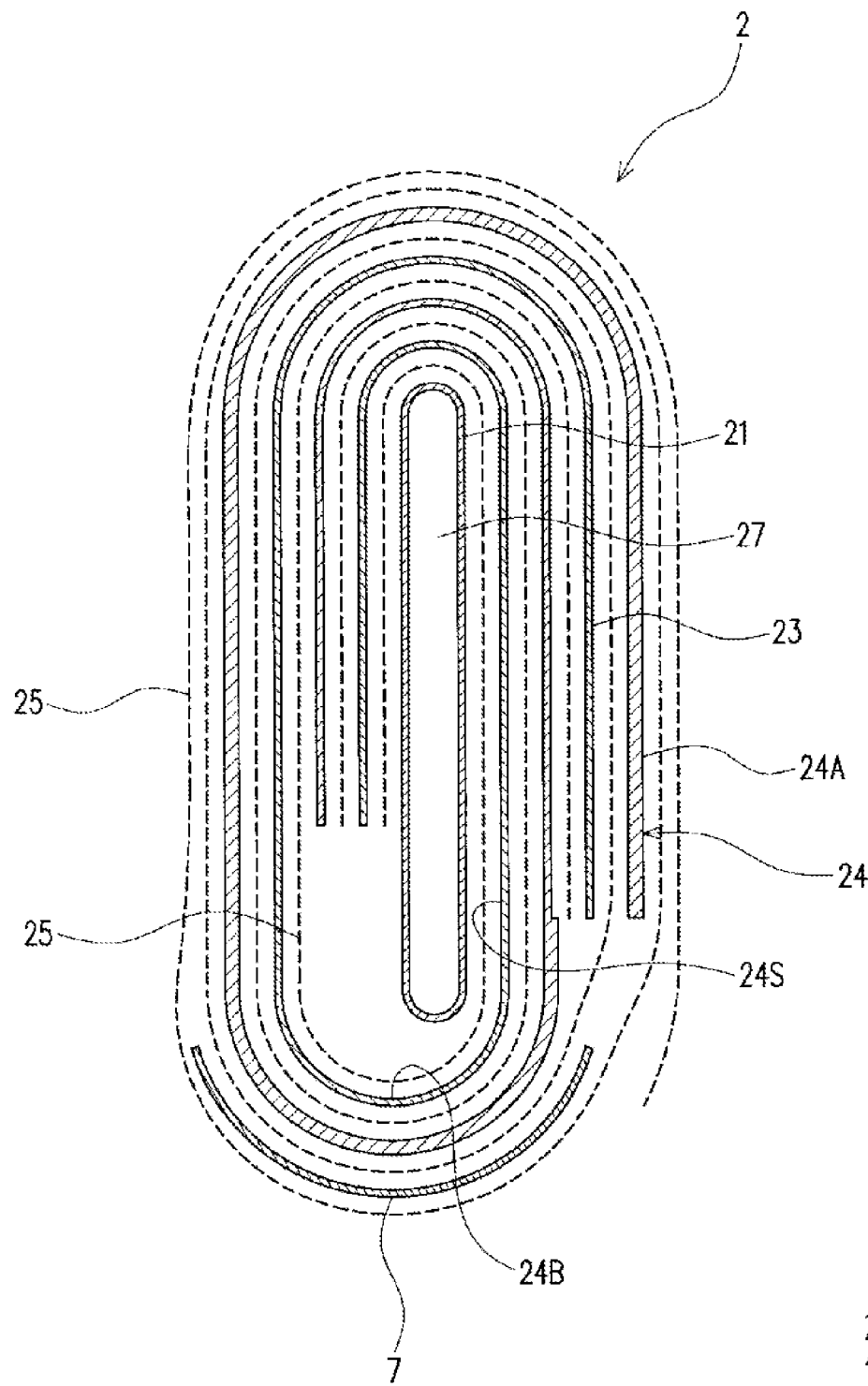
FIG. 4 is a schematic cross-sectional view for explaining the electrode assembly.
Figure 4:
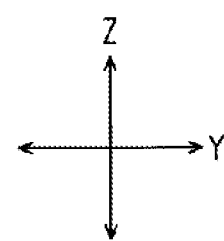

In this regard, as shown in FIG. 4, the negative electrode 24 is located outside the positive electrode 23 at the outer end of the electrode assembly 2 in the stacking direction. More specifically, the positive electrode 23 and the negative electrode 24 are wound such that the negative electrode 24 is located outside the positive electrode 23 at the winding end position in the case where the electrodes are around the winding core 21. In addition, the separator 25 is wound and stacked outside the outermost peripheral site of the negative electrode 24 (the site of the negative electrode 24 located on the outermost periphery of the electrode assembly 2 excluding the separator 25) 24A. It is to be noted that while the thickness of the site corresponding to the outermost peripheral site of the negative electrode is increased in FIG. 4 in order to show the extent of the outermost peripheral site 24A, the actual negative electrode has substantially the thickness from the end on the winding center side to the outer edge.

Furthermore, in the electrode assembly 2 according to the present embodiment, as shown in FIGS. 2 and 3, an uncoated stacked part 26 in the electrode assembly 2 is composed of the site where only the uncoated part of the positive electrode 23 or the uncoated part of the negative electrode 24 is stacked. This uncoated stacked part 26 is a site that has electrical conduction to the current collector 5 in the electrode assembly 2. The uncoated stacked part 26 according to the present embodiment has two segmented sites (divided uncoated stacked parts) 261 with a hollow 27 sandwiched therebetween, as viewed from the direction along the winding axis C of the wound positive electrode 23, negative electrode 24, and separator 25.

Figure 5:
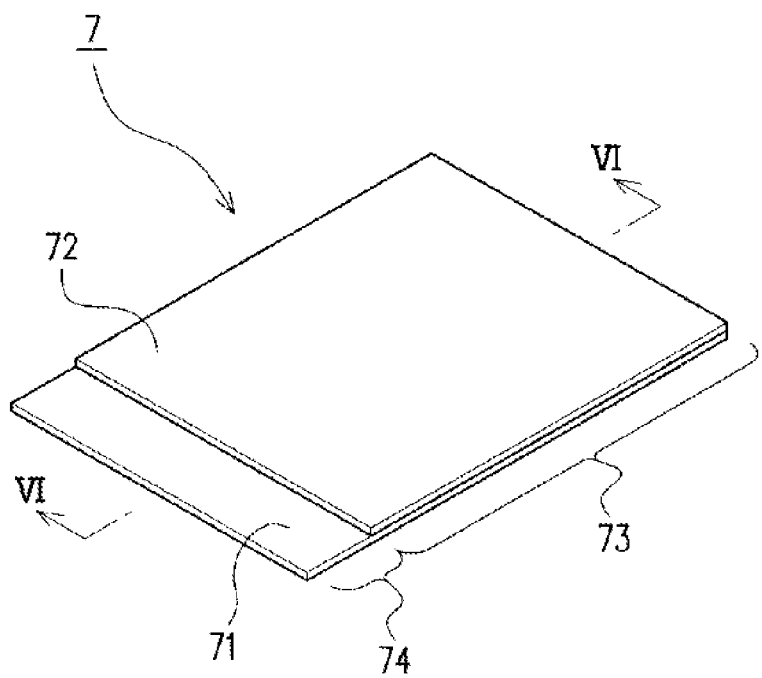
FIG. 5 is a perspective view of an ion supply member.
Figure 5:
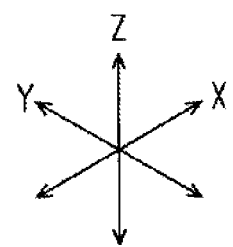
Figure 6:
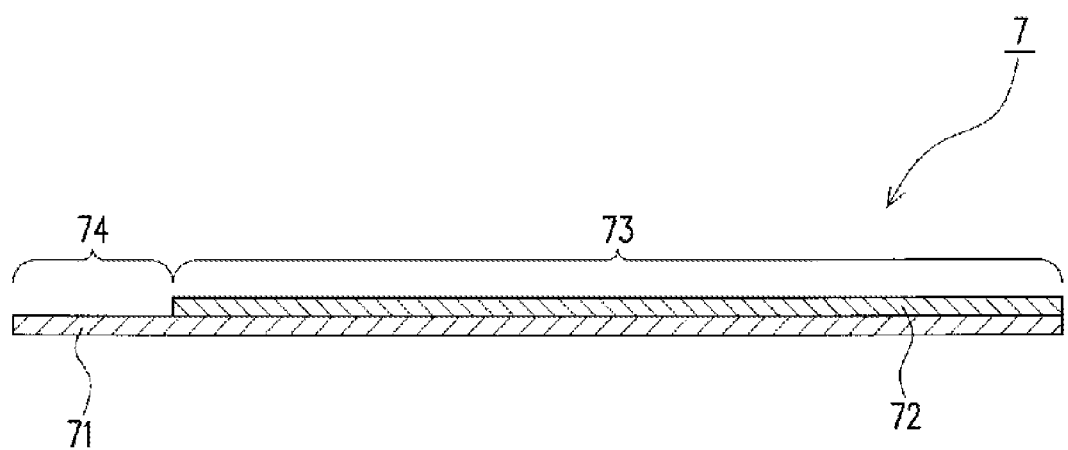
FIG. 6 is a cross-sectional view along VI-VI in FIG. 5.

The ion supply member 7 supplies the negative electrode 24 with metal ions for compensating for the irreversible capacity (initial irreversible capacity) generated in the negative electrode 24 when the energy storage device 1 is initially charged and discharged. The ion supply member 7 has, as shown in FIGS. 5 and 6, a conductive member 71 and an alkali metal or alkaline earth metal 72 disposed on the conductive member 71. The conductive member 71 has electrical conduction to the electrodes 23 and 24. Specifically, the ion supply member 7 has a conductive sheet 71 and a metal layer 72 of alkali metal or alkaline earth metal stacked on the sheet 71. The size of the metal layer 72 is set based on the irreversible capacity mentioned above.

For the ion supply member 7, the sheet 71 is a copper foil, and the metal layer 72 is formed from Li. For the ion supply member 7 according to the present embodiment, the sheet 71 is a rectangular copper foil, and the metal layer (Li layer) 72 covers one surface of the sheet 71, with one end of the sheet 71 left in the longitudinal direction thereof. Hereinafter, the site of the ion supply member 7 on which the metal layer 72 is stacked is referred to as a stacked part 73, and the site of the ion supply member 7 on which the metal layer 72 is not stacked is referred to as a non-stacked part 74.

Figure 7:
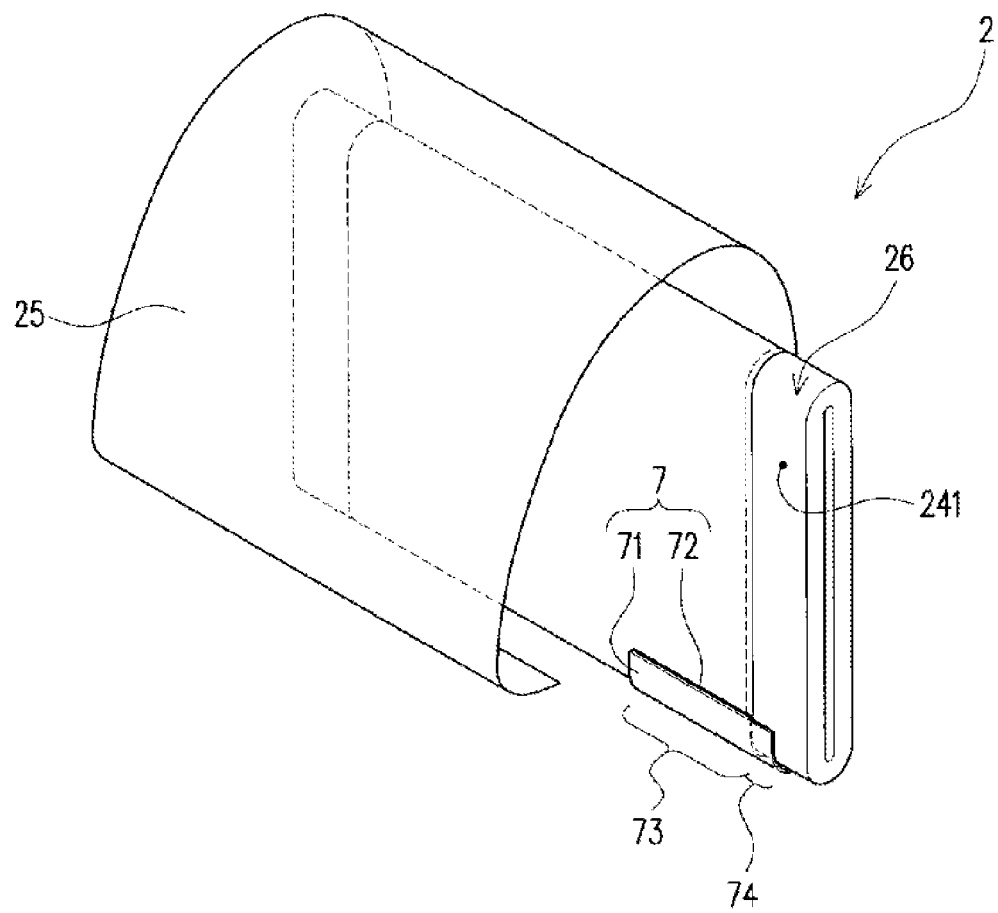
FIG. 7 is a diagram illustrating the position of mounting the ion supply member to the electrode assembly.
Figure 7:
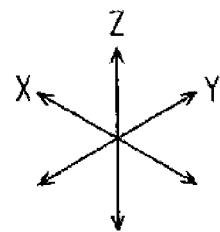

The ion supply member 7 is disposed outside the outermost electrode (specifically, the outermost peripheral site 24A of the negative electrode 24) in the direction of stacking the electrodes 23 and 24 in the electrode assembly 2. Specifically, in the ion supply member 7, the non-stacked part 74 is conductively connected (fixed conductively) to the uncoated part (metal foil 241) of the negative electrode 24, with the metal layer 72 opposed to the negative active material layer 242 with the separator 25 interposed therebetween. Further, the ion supply member 7 is, as also shown in FIGS. 4 and 7, wrapped in the separator 25, with the stacked part 73 wound and stacked outside the outermost peripheral site 24A of the negative electrode 24. In the example of the present embodiment, the ion supply member 7 is sandwiched between the first layer and second layer of the separator 25 wound and stacked outside the outermost peripheral site 24A. In this regard, the metal layer 72 is opposed to the outer negative active material layer 242 of the outermost peripheral site 24A of the negative electrode 24 with the separator 25 interposed therebetween, from the outside in the direction of stacking the layered product 22 (positive electrode 23, negative electrode 24, and separator 25). The ion supply member 7 according to the present embodiment is disposed at the curved part of the electrode assembly 2 close to a closed part 311 of the case 3 (the lower curved part of the electrode assembly 2 in FIGS. 2 and 4).

Returning to FIGS. 1 and 2, the case 3 has a case body 31 with an opening and a lid plate 32 that blocks (closes, the opening of the case body 31. In this case 3, the internal space is defined by the case body 31 and the lid plate 32. The case 3 houses, in the internal space, the electrolyte solution together with the electrode assembly 2 and the current collector 5. For this reason, the case 3 is formed from a metal that, has resistance to the electrolyte solution. The case 3 according to the present embodiment is formed from, for example, aluminum or an aluminum-based metal material such as an aluminum alloy.

The case body 31 includes the plate-shaped closed part 311 and a tubular body (peripheral wall) 312 connected to the peripheral edge of the closed part 311.

The closed part 311 is a site located at the lower end of the case body 31 in the case where the case body 31 is disposed with the opening facing upward (that is, a site that serves as the bottom wall of the case body 31 with the opening facing upward). The closed part 311 according to the present embodiment has a rectangular shape.

In the following, the direction along the long side of the closed part 311 is regarded as the X axis of the Cartesian coordinate system, the direction along the short side of the closed part 311 is regarded as the Y axis of the Cartesian coordinate system, and the direction normal to the closed part 311 is regarded as the Z axis of the Cartesian coordinate system.

The body 312 has a square tubular shape, more specifically, a flattened square tubular shape. The body 312 has a pair of long walls 313 extending from the long sides at the peripheral edge of the closed part 311 and a pair of short walls 314 extending from the short sides at the peripheral edge of the closed part 311. The short walls 314 each connects corresponding ends (specifically, opposed in the Y-axis direction) of the pair of long walls 313 to each other, thereby forming the square tubular body 312.

As described above, the case body 31 has a square tubular shape (that is, a bottomed square tubular shape) with one end closed in the opening direction (Z-axis direction). This case body 31 houses therein the electrode assembly 2 with the winding shaft C oriented in the X-axis direction (see FIG. 2).

The lid plate 32 is a member that blocks the opening of the case body 31. The contour shape of the lid plate 32 is a shape corresponding to an opening peripheral edge 310 (see FIG. 2) of the case body 31. More specifically, the lid plate 32 is a rectangular plate material that is long in the X-axis direction.

Figure 8:
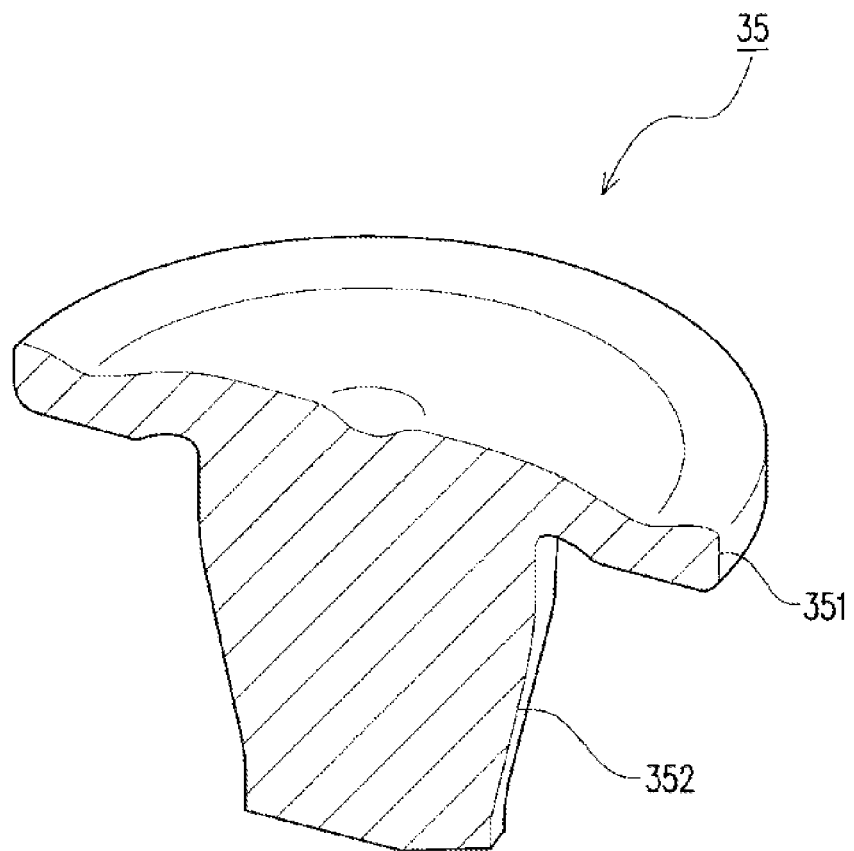
FIG. 8 is a cross-sectional perspective view of an electrolyte solution filling plug.

The lid plate 32 according to the present embodiment is provided with an electrolyte solution filling hole 320. The electrolyte solution filling hole 320 penetrates the lid plate 32 in the Z-axis direction (thickness direction), thereby communicating with the inside and outside of the case 3. This electrolyte solution filling hole 320 is hermetically closed (sealed) with an electrolyte solution filling plug 35. More specifically, the energy storage device 1 includes the electrolyte solution filling plug 35. The electrolyte solution filling plug 35 has, as shown in FIGS. 1 and 8, a head 351 that covers the electrolyte solution filling hole 320 and an insertion 352 that extends from the head 351. The electrolyte solution filling plug 35 according to the present embodiment is fixed to the lid plate 32 by welding the peripheral edge of the head 351 and the lid plate 32 with the insertion 352 inserted in the electrolyte solution filling hole 320.

The case 3 according to the present embodiment is formed by joining the peripheral edge of the lid plate 32 and the opening peripheral edge 310 of the case body 31 stacked on one another. For the case 3 according to the present embodiment, the opening peripheral edge 310 of the case body 31 and the peripheral edge of the lid plate 32 are joined by welding.

The external terminal 4 is a site electrically connected to an external terminal of another energy storage device, an external device, or the like. For this reason, the external terminal 4 is formed from a conductive member. In addition, the external terminal 4 is formed from a metal material with high weldability. For example, the external terminal 4 of the positive electrode is formed from aluminum or an aluminum-based metal material such as an aluminum alloy, and the external terminal 4 of the negative electrode is formed from copper or a copper-based metal material such as or a copper alloy. The external terminal 4 according to the present embodiment is, with at least a part thereof exposed to the outside of the case 3, attached to the lid plate 32. The external terminal 4 has, as shown in FIGS. 1 and 2, a surface 41 to which a bus bar or the like can be welded.

The current collector 5 is disposed in the case 3 and is directly or indirectly connected conductively to the electrode assembly 2. The current collector 5 according to the present embodiment is conductively connected to the electrode assembly 2 with a clip member 50 interposed therebetween. More specifically, the energy storage device 1 includes the clip member 50 that conductively connects the electrode assembly 2 and the current collector 5.

The current collector 5 is formed from a conductive member. The current collector 5 is disposed along the inner surface of the case 3. The current collector 5 conductively connects the external terminal 4 and the clip member 50. Specifically, the current collector 5 has a first connection 51 conductively connected to the external terminal 4 and a second connection 52 conductively connected to the electrode assembly 2. For the current collector 5, the first connection 51 extends along the lid plate 32 from the vicinity of the boundary between the lid plate 32 and the short wall 314 in the case 3, and the second connection 52 extends along the short wall 314 from the outer end of the first connection 51 in the X-axis direction. The second connecting portion 52 according to the present embodiment is joined to the clip member 50 by, for example, ultrasonic welding.

The current collector 5 configured as described above is disposed for each of the positive electrode and negative electrode of the energy storage device 1. For the energy storage device 1 according to the present embodiment, the current collector 5 is disposed for each of the uncoated staked part 26 of the positive electrode of the electrode assembly 2 and the uncoated stacked part 26 of the negative electrode thereof in the case 3. The current collector 5 of the positive electrode and the current collector 5 of the negative electrode are formed from different materials. Specifically, the current collector 5 of the positive electrode is formed from, for example, aluminum or an aluminum alloy, and the current collector 5 of the negative electrode is formed from, for example, copper or a copper alloy.

The clip member 50 sandwiches the positive electrode 23 or the negative electrode 24 stacked at the uncoated stacked part 26 (specifically, the divided uncoated stacked part 261) of the electrode assembly 2 so as to bundle the electrode. Thus, the clip member 50 provides electrical conduction between the uncoated parts of the positive electrode 23 or the uncoated parts of the negative electrode 24 stacked at the uncoated stacked part 26. The clip member 50 according to the present embodiment is formed by bending a plate-shaped metal material so as to have a U-shaped cross section.

The insulating member 6 is disposed between the case 3 (specifically, the case body 31) and the electrode assembly 2. The insulating member 6 is formed from an insulating resin. The insulating member 6 according to the present embodiment is formed by bending a sheet-shaped insulating member cut into a predetermined shape.

Figure 9:
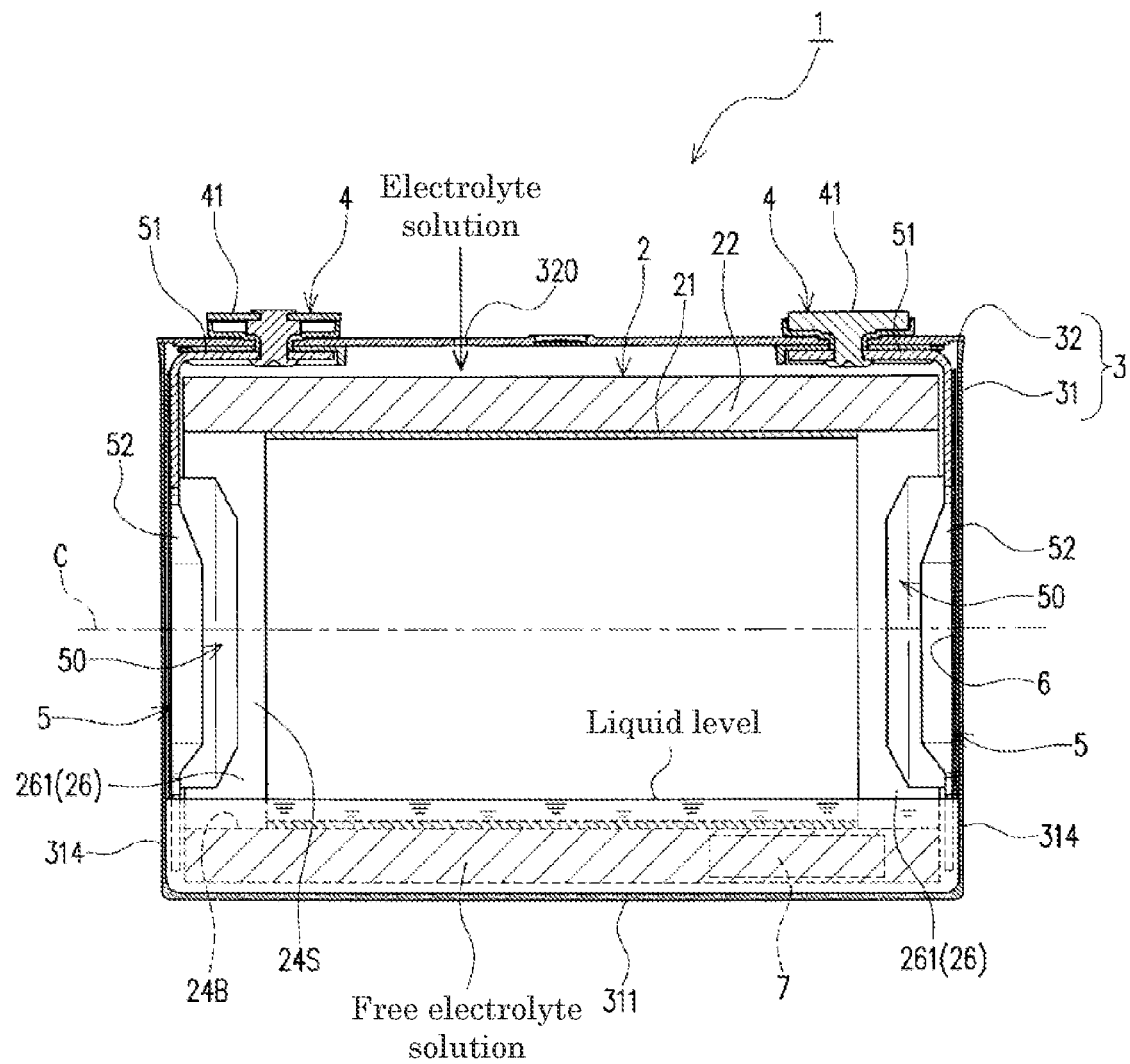
FIG. 9 is a diagram for explaining the injection of an electrolyte solution into a case.
Figure 9:
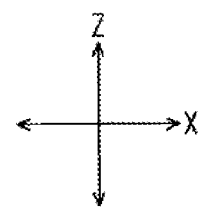

Next, the method for manufacturing the energy storage device 1 will be described with reference to FIG. 9 in addition to FIGS. 1 to 8 as references in the description of the configuration of the energy storage device 1.

First, the ion supply member 7 is attached to the electrode assembly 2. In the manufacturing method according to the present embodiment, the ion supply member 7 is attached to the electrode assembly 2 in the formation of the electrode assembly 2. Specifically, here is the attachment.

The winding core 21 is formed by winding a sheet made of a synthetic resin. Next, the separator 25, the positive electrode 23, the separator 25, and the negative electrode 24 are wound around the winding core 21 so as to be stacked in order.

After the completion of winding the positive electrode 23 and the negative electrode 24, the separator 25 continues to be wound. More specifically even after the completion of winding the positive electrode 23 and the negative electrode 24, the separator 25 still continues to be wound while involving the ends of the positive electrode 23 and negative electrode 24 on the winding end side. Thus, the separator 25 is wound and stacked (wrapped) around the outermost peripheral site 24A of the negative electrode 24.

In winding (winding and stacking) only the separator 25, when the first layer of the separator 25 is wound around the outermost peripheral site 24A of the negative electrode 24, the stacked part 73 of the ion supply member 7 is disposed on the separator 25 such that the metal layer 72 is opposed to the negative active material layer 242 with the separator 25 (the separator 25 constituting the first layer) interposed therebetween, and the non-stacked part 74 of the ion supply member 7 is connected (fixed) to the uncoated part of the negative electrode 24 by ultrasonic welding or resistance welding. When the non-stacked part 74 of the ion supply member 7 is connected to the uncoated part (metal foil 241) of the outermost peripheral site 24A of the negative electrode 24, the separator 25 restarts to be wound, thereby causing the separator 25 to press the stacked part 73 of the ion supply member 7 (that is, causing the stacked part 73 to be sandwiched between the first-layer separator 25 and second-layer separator 25 wound outside the outermost peripheral site 24A of the negative electrode 24).

When the separator 25 is wound a predetermined number of times, the end of the separator 25 on the winding end side is blocked with a tape or the like, thereby finishing the electrode assembly 2.

Next, the electrode assembly 2 with the clip member 50 attached to the divided uncoated stacked part 261 is mounted to the lid plate 32 with the external terminals 4, the current collectors 5, and the like assembled. Specifically, the clip member 50 is attached to the electrode assembly 2 so as to sandwich the divided uncoated stacked part 261, and the attached clip member 50 is connected by ultrasonic joining to the second connection 52 of the current collector 5. In this regard, the electrolyte solution filling plug 35 is not attached to the lid plate 32, that is, the electrolyte solution filling hole 320 is released (unsealed).

After the electrode assembly 2, the current collectors 5, the external terminals 4, and the like are assembled on the lid plate 32, the insulating member 6 is put over the electrode assembly 2, and the electrode assembly 2 assembled on the lid plate 32 is inserted into the case body 31 until the lid plate 32 abuts on the opening peripheral edge 310 of the case body 31. After the lid plate 32 abuts on the opening peripheral edge 310 of the case body 31, the boundary between the lid plate 32 and the opening peripheral edge 310 of the case body 31 is subjected to welding (laser welding or the like).

After the lid plate 32 and the case body 31 are welded together, a predetermined amount of electrolyte solution is injected (electrolyte solution filling) into the case 3 from the electrolyte solution filling hole 320. In this regard, the electrolyte solution injected into the case 3 partially soaks into the electrode assembly 2 (separator 25 and the like), and the remaining electrolyte solution accumulates in the case 3 as a free electrolyte solution. More specifically, the free electrolyte solution in the present embodiment is an electrolyte solution accumulating in the lower part of the case 3 without soaking into the electrode assembly 2 in the case 3. In this regard, the predetermined amount refers to an amount in which the metal layer 72 of the ion supply member 7 is at least partially immersed in the free electrolyte solution, which has not soaked into the electrode assembly 2 (specifically, the separator 25 and the like included in the electrode assembly 2), in the case 3. According to the present embodiment, the electrolyte solution is injected into the case 3 in an amount such that the whole metal layer 72 (stacked part 73) of the ion supply member 7 is immersed iii the free electrolyte solution. More specifically, as shown in FIG. 9, with the energy storage device 1 in the posture for aftermentioned initial charge or thereafter leaving for a predetermined period of time, the electrolyte solution is injected until the liquid level of the free electrolyte solution is located above the top end of the ion supply member 7 attached to the electrode assembly 2. As described above, the electrolyte solution is injected into the case 3 in an amount such that the whole metal layer 72 (stacked part 73) of the ion supply member 7 is immersed in the free electrolyte solution, thereby causing lithium ions to elute efficiently into the free electrolyte solution from the whole metal layer 72. As a result, the precharge is allowed to proceed in a shorter period of time. In addition, according to the present embodiment, the electrolyte solution is injected until the liquid level of the free electrolyte solution is located on or above the lower end 24B of the innermost peripheral surface (that is, the surface facing the inside (close to the hollow 27) of the electrode 23, 24 (specifically, the site of the electrode 23, 24) located at the innermost periphery of the electrode assembly 2) 24S of the electrode 23 or 24 wound.

The injection of the electrolyte solution produces a potential difference between the metal layer 72 of the ion supply member 7 and the negative active material layer 242 of the negative electrode 24 to which the ion supply member 7 is connected, thereby releasing Li constituting the metal layer 72 as Li$^+$ (metal ion) into the free electrolyte solution from the metal layer 72. More specifically, from the metal layer 72, Li starts to dissolve in the free electrolyte solution.

After the completion of injecting the electrolyte solution, the energy storage device 1 is subjected to first charge (initial charge) with the electrolyte solution filling hole 320 released (before sealing with the electrolyte solution filling plug 35). The posture of the case 3 in this case is the same as the posture in the case of injecting the electrolyte solution, that is, the posture with the closed part 311 located below and the lid plate 32 located above (see FIG. 9).

After the completion of the initial charge, the electrolyte solution filling plug 35 is inserted into the electrolyte solution filling hole 320, and the peripheral edge of the head 351 and the peripheral edge of the electrolyte solution filling hole 320 of the lid plate 32 are welded to seal the electrolyte solution filling hole 320.

Next, whether the energy storage device 1 has any internal short-circuit or not is checked. Specifically, the energy storage device 1 is subjected to charge for checking any internal short-circuit, and then left for a predetermined period of time. This predetermined period of time is a period of time (leaving period) for checking any defective product. For example, specifically, the energy storage device 1 is left in a room at an atmospheric temperature of 25° C. to 45° C. for about 15 hours to 3 days. In this case, if the energy storage device 1 has an internal short-circuit, the voltage will drop sufficiently though the leaving period to the extent that the voltage can be reliably sorted by measurement, thus allowing the defective product (the energy storage device 1 with internal short-circuit) to be reliably selected by voltage measurement after the leaving period.

Subsequently, the capacity of the energy storage device 1 is checked. Specifically, the energy storage device 1 is subjected to charge-discharge for checking the capacity. The energy storage device 1 made available for shipment by sorting based on the voltage measurement in the charge-discharge is ready for shipment for shipment as a finished product.

While the energy storage device 1 manufactured in this manner has a high irreversible capacity (initial irreversible capacity) generated mainly in the first charge-discharge cycle (charge-discharge for checking any internal short-circuit in the example of the present embodiment), Li dissolved in the free electrolyte solution from the ion supply member 7 (specifically, Li$^+$ released from the ion supply member 7) is stored (precharged) by the negative active material layer 242, thereby reducing (decreasing) the irreversible capacity. According to the present embodiment, even during this precharge, the posture of the case 3 in this case is the same as the posture in the case of injecting the electrolyte solution, that is, the posture with the closed part 311 located below and the lid plate 32 located above (see FIG. 9).

It is to be noted that in order to allow the precharge to proceed appropriately, the leaving time is preferably 15 hours or longer, more preferably one clay or longer, further preferably two clays or longer. In this precharge, in the energy storage device 1, Li$^+$ is released from the metal layer 72 of the ion supply member 7 into the free electrolyte solution, thereby gradually reducing the metal layer 72. In one aspect, the sheet 71 is left finally without the metal layer 72.

In accordance with the foregoing method for manufacturing the energy storage device 1, the metal layer (alkali metal or alkaline earth metal) 72 that has electrical conduction through the electrode assembly 2 and the sheet (conductive member) 71 is at least partially immersed in the free electrolyte solution in the case 3 of the energy storage device 1 manufactured, thereby causing the immersed metal layer 72 to dissolve rapidly in the free electrolyte solution, that is, rapidly releasing metal ions from the metal layer 72 into the free electrolyte solution.

In addition, in the energy storage device 1 manufactured by the method for manufacturing the energy storage device 1 according to the present embodiment, the ion supply member 7 is disposed outside the outermost electrode (specifically, the outermost peripheral site 24A) in the direction of stacking the electrodes 23 and 24. Thus, in the manufactured energy storage device 1, performance can be prevented from being degraded by the decreased area of the electrodes 23 and 24 opposed to each other due to the ion supply member 7 disposed between the electrodes 23 and 24.

Further, in the method for manufacturing the energy storage device 1 according to the present embodiment, when the posture of the case 3 is the posture with the closed part 311 located below and the lid plate 32 located above (see FIG. 9) during the initial charge, or during the initial charge and for the leaving period after the initial charge, the liquid level of the free electrolyte solution is located on or above the lower end 24B of the innermost peripheral surface (the surface facing the hollow 27) 24S in the wound electrodes 23 and 24. Thus, Li$^+$ in the free electrolyte solution (the alkali metal or alkaline earth metal dissolved in the free electrolyte solution) is supplied to each layer 24 of the electrode assembly 2 through the free electrolyte solution, thereby efficiently precharging the electrode 24. More specifically, as compared with the case where metal ions obtained by precharge move (diffuse) through the negative active material layer 242 or move through the electrolyte solution that has soaked into the separator 25, the movement through the free electrolyte solution makes it possible to remarkably shorten the distance of the metal ions released from the ion supply member 7 disposed on the outer periphery of the electrode assembly 2 to reaching the winding center of the electrode assembly 2, thereby allowing metal ions to be quickly supplied to the winding center of the wound-type electrode assembly 2.

In this regard, in the case where the liquid level of the free electrolyte solution, the position of the metal layer 72, and the position of the lower end 24B of the innermost peripheral surface 24S of the wound electrode 23, 24 wound in the energy storage device 1 as a finished product can be checked by X-ray measurement without disassembling the energy storage device 1, the heights is compared, thereby making it possible to confirm whether the alkali metal or the alkaline earth metal is at least partially immersed in the free electrolyte solution or not, and whether the lower end 24B has contact with the free electrolyte solution or not (that is, whether the electrodes 23, 24 constituting the respective layers stacked at least partially have contact with the free electrolyte solution or not). In the case where the position of the metal layer 72 or the position of the lower end 24B of the innermost peripheral surface 24S of the wound electrode 23, 24 fails to be checked by X-ray measurement, the energy storage device 1 is disassembled to take out the contents, thereby making it possible to check the positions before dismantling.

In addition, in the case where the liquid level of the free electrolyte solution fails to be checked by X-ray measurement, whether the alkali metal or alkaline earth metal of the ion supply member 7 is immersed in the free electrolyte solution or not, and whether the electrodes 23, 24 constituting the respective layers stacked at least partially have contact with the free electrolyte solution or not may be determined by the following steps 1 to 6, if necessary.

1. The upper surface (for example, the lid plate 32) is removed from the case 3 of the energy storage device 1, and the electrode assembly 2 is pulled out from the case 3.

2. The volume of the free electrolyte solution remaining in the case 3 is determined.

3. The removed electrode assembly 2 is immersed in a solvent (hereinafter referred to as a mixed solvent) in which ethylene carbonate and diethyl carbonate are mixed at a volume ratio of 1:1 in an airtight container, and the inside of the airtight container is subjected to vacuuming to allow the solvent to penetrate sufficiently into the pores of electrode assembly 2.

4. The electrode assembly 2 sufficiently impregnated with the mixed solvent is taken out from the airtight container, the electrode assembly 2 is gradually inserted from the lower end into a container fully filled with the mixed solvent, and then stopped at the position where the lower end of the alkali metal or alkaline earth of the ion supply member 7 coincides with the liquid surface of the mixed solvent or at the position where all of the layers of the electrodes 23, 24 stacked at least partially manage to have contact with the mixed solvent, and the electrode assembly 2 is pulled up from the mixed solvent.

5. The weight of the mixed solvent overflowing from the container in the operation of the foregoing 4. is measured to determine the volume of the overflowing mixed solvent from its specific gravity 6. The sum of the volume of the free electrolyte solution remaining in the case 3 in the foregoing 2. and the volume of the overflowing mixed solvent determined in the foregoing 5. is compared with the inner volume of the case 3 that is lower than the level of the lower end of the alkali metal or alkaline earth metal of the ion supply member 7 or the lower end of the layer with lower end located at the highest position among the respective layers of the electrodes 23, 24 stacked, in the case where the electrode assembly 2 is disposed in the case 3. As a result, in the case where the sum of the volume of the free electrolyte solution remaining in the case 3 in the foregoing 2. and the volume of the overflowing mixed solvent determined in the foregoing 5. is larger than the inner volume of the case 3, it can be determined that in the energy storage device 1, the liquid level of the free electrolyte solution is located at a position that is not lower than the lower end of the alkali metal or alkaline earth metal of the ion supply member 7 or at a position where the free electrolyte solution has contact with at least part of the electrodes 23, 24 constituting the respective layers stacked.

In addition, in the method for manufacturing the energy storage device 1 according to the present embodiment, the ion supply member 7 is disposed so as to be sandwiched by the separator 25 in winding and stacking the separator 25 outside the outermost peripheral site 24A of the negative electrode 24 in the formation of the electrode assembly 2.

Such a configuration allows the ion supply member 7 to be attached in forming the electrode assembly 2 by winding the positive electrode 23, the negative electrode 24, and the separator 25, for the manufactured energy storage device 1. More specifically, the formation of the electrode assembly 2 and the attachment of the ion supply member 7 can be performed at the same time (in the same step).

Moreover, the ion supply member 7 is sandwiched and fixed by the separator 25, thereby preventing the ion supply member 7 from coming into contact with (catching or the like) the other members in manufacturing the energy storage device 1 (e.g. during insertion into the case body 31 after assembling on the lid plate 32). Thus, the ion supply member 7 can be prevented (kept) from being damaged due to the contact.

Furthermore, the long negative electrode 24 is wound, that is, the negative active material layer 242 is continuous from the outermost periphery to the winding center, and the metal ions ($Li^+$) stored on the outer peripheral side diffuse (move) through the negative active material layer 242 to extend to the winding center. Thus, the metal ions released from the metal layer 72 are suitably supplied even to the negative active material layer 242 in the winding center of the electrode assembly 2 by the movement through the free electrolyte solution and the diffusion in the negative active material layer 242. In this regard, the supply of metal ions to each layer 24 through the free electrolyte solution is quicker than the diffusion of metal ions in the negative active material layer 242. For this reason, at least a metal ion pathway formed by the free electrolyte solution (specifically, a pathway through which metal ions can move rapidly outside the electrode assembly 2) has only to be secured in the energy storage device 1 manufactured by the manufacturing method according to the present embodiment.

In addition, in the method for manufacturing the energy storage device 1 according to the present embodiment, the electrode assembly 2 has the negative electrode 24 and the positive electrode 23 as electrodes, and the separator 25 disposed between the positive electrode 23 and the negative electrode 24. The negative electrode 24 has the conductive foil 241 and the negative active material layer 242 laminated on the foil 241. The ion supply member 7 has the conductive member 71, and the metal layer 72 containing an alkali metal or an alkaline earth metal, disposed on the conductive member 71. The ion supply member 7 has the stacked part 73 with the metal layer 72 stacked, and the non-stacked part 74 without the metal layer 72 stacked. The non-stacked part 73 of the ion supply member 7 has electrical conduction to the foil 241 of the negative electrode 24, with the metal layer 72 opposed to the negative active material layer 242 with the separator 25 interposed therebetween. This supplies the metal ions to the negative active material layer 242 also through the electrolyte solution soaking into the separator 25 from the metal layer 72 of the ion supply member 7, in addition to the previously described metal ion pathway formed by the free electrolyte solution. Thus, the metal ions can be more quickly supplied to the negative active material layer 242.

In addition, in accordance with the method for manufacturing the energy storage device 1, the positive electrode 23 and the negative electrode 24 are wound with the separator 25 interposed therebetween for the electrode assembly 2. The separator 25 is wound and stacked at the outermost periphery of the electrode assembly 2. The ion supply member 7 has the staked part 73 disposed between the separators 25 wound and stacked at the outermost periphery of the electrode assembly 2. This ensures that the ion supply member 7 is held for the electrode assembly 2 and allows metal ions to be supplied from the metal layer 72 to the negative active material layer 242 through the separator 25, since the separator 25 is wound and stacked outside the stacked 73 of the ion supply member 7, thereby allowing metal ions to be more reliably suppled from the metal layer 72 to the negative active material layer 242.

In addition, in accordance with the method for manufacturing the energy storage device 1 according to the present embodiment, the negative active material layer 242 is laminated on both sides of the foil 241 in the negative electrode 24. For the electrode assembly 2, the outermost peripheral site 24A of the negative electrode 24 is disposed outside the outermost peripheral site of the positive electrode 23. More specifically, the outer negative active material layer 242 (the negative active material layer laminated on the surface of the metal foil 241 facing the outer peripheral side) is not opposed to the positive active material layer 232 at the outermost peripheral site 24A of the negative electrode 24, and the metal ion supply pathway leading from the metal layer 72 of the ion supply member 7 through the separator 25 to the negative active material layer 242 thus has no positive active material layer 232. The above-mentioned configuration allows, at the outermost peripheral site 24A of the negative electrode 24, metal ions to be rapidly supplied and then diffused from the metal layer 72 through the separator 25 to the outer negative active material layer 242 that is not opposed to the positive active material layer 232. Thus, various problems due to the presence of the outer negative active material layer 242 that is not opposed to the positive active material layer 232 (for example, the durable initial capacity retention ratio decreased by precipitation of metal ions supplied from the metal layer 72 on the positive electrode surface) can be eliminated or alleviated.

Furthermore, in accordance with the method for manufacturing the energy storage device 1, the ion supply member 7 is disposed at the curved part of the electrode assembly 2 (the lower curved part of the electrode assembly 2 in FIGS. 2 and 4). This allows the ion supply member 7 to be more firmly fixed by applying tension (and thus, the metal layer 72 to be reliably opposed to the negative active material layer 242 with the separator 25 interposed therebetween), thereby allowing metal ions to be more reliably supplied from the metal layer 72 to the negative active material layer 242.

Example 1

Here are the experimental conditions and experimental results of the experiment carried out for confirming the effect of the method for manufacturing the energy storage device 1 according to the embodiment mentioned above.

<Experimental Conditions>

(1) Li metal foil was attached to four electrode assemblies (wound-type electrode assemblies) A to D configured in the same fashion in accordance with the following conditions:

Electrode assembly A: the Li metal foil was attached to a negative active material layer.

Electrode assembly B: the Li metal foil was attached onto a copper foil electrically connected to a negative electrode.

Electrode assembly C: the Li metal foil was attached to a negative active material layer.

Electrode assembly D: the Li metal foil was attached onto a copper foil electrically connected to a negative electrode.

(2) Thereafter, the electrode assembly A and the electrode assembly B were immersed in an electrolyte solution to soak the electrodes and the separators with the electrolyte solution, and the excess electrolyte solution was then discarded. In contrast, the electrode assembly C and the electrode assembly D were immersed in the electrolyte solution to soak the electrodes and the separators with the electrolyte solution, and the electrode assemblies C and D were then left immersed in the excess electrolyte solution without discarding the excess electrolyte solution.

(3) Subsequently, the electrode assemblies A to D were allowed to stand at room temperature as they were, and whether precharge proceeded or not was mainly visually checked. (If the Li metal foil attached to the electrode assembly disappears, precharge in progress can be determined.)

<Experimental Results>

Electrode assembly A: almost no precharge was successfully achieved.

Electrode assembly B: almost no precharge was successfully achieved.

Electrode assembly C: precharge was not completed for 13 days after electrolyte solution filling, with evidence that the precharge proceeded a little.

Electrode assembly D: precharge was successfully achieved for 13 days after electrolyte solution filling. (It was confirmed that the attached Li metal foil completely reacted and then disappeared. The Li metal foil left for 9 days after the electrolyte solution filling).

Example 2

In addition, the following experiments were also carried out.

<Experimental Conditions>

Figure 10:
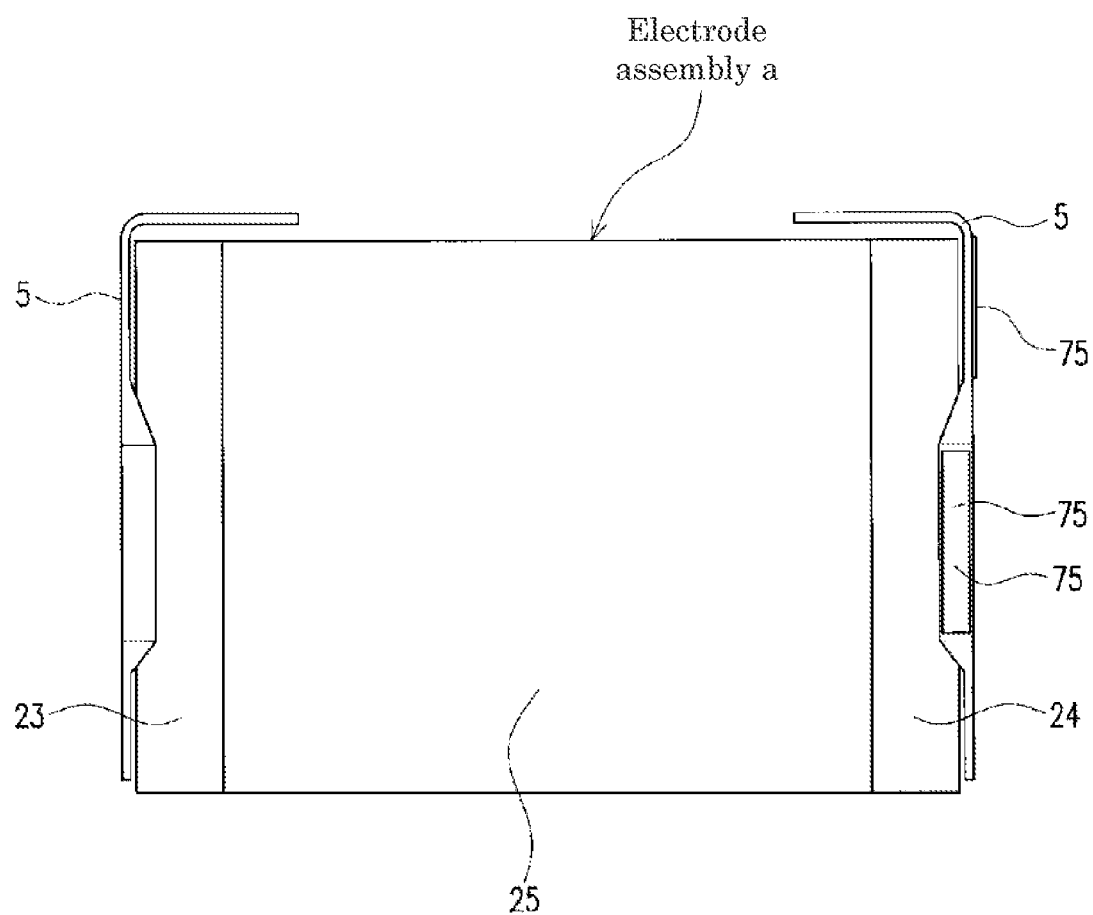
FIG. 10 is a diagram for explaining the positions of attaching Li pieces in Example 2.
Figure 11:
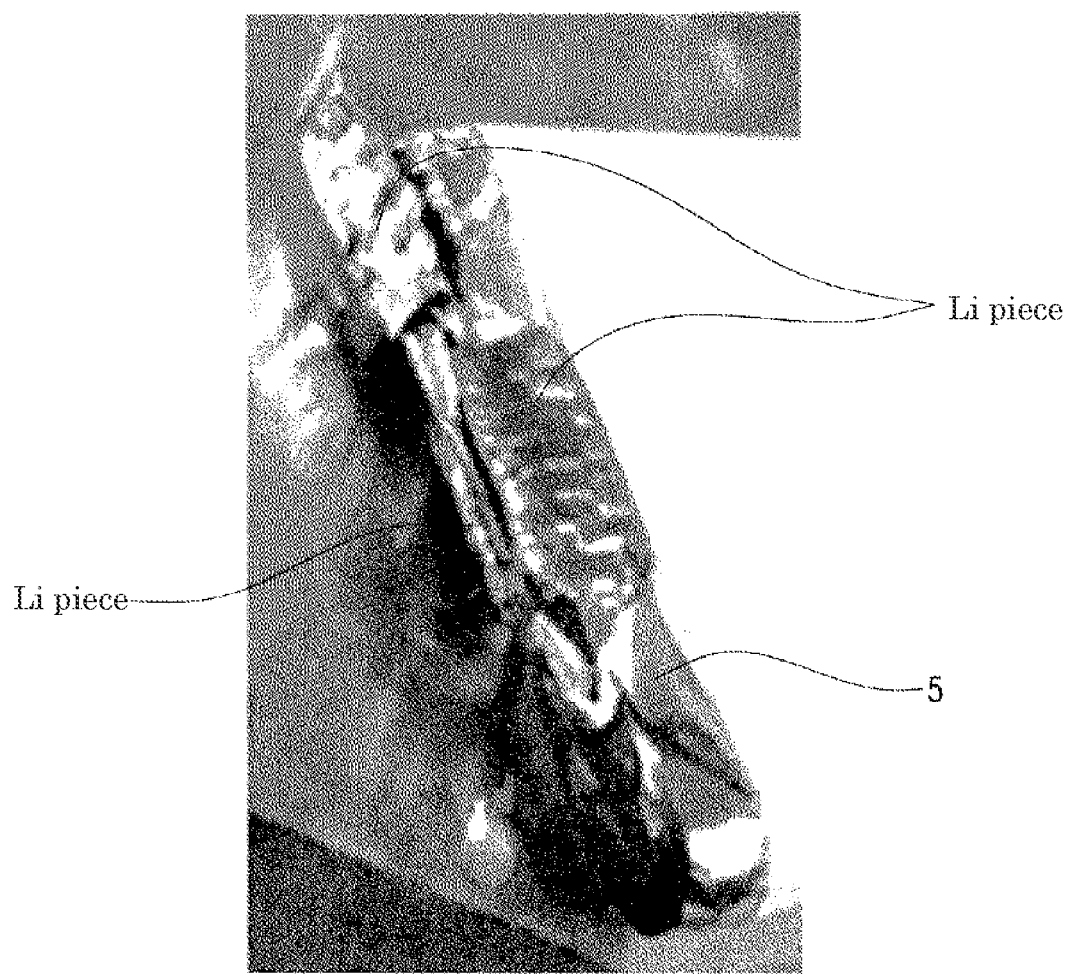
FIG. 11 is a photograph showing the positions of attaching the Li pieces in Example 2.
Figure 12:
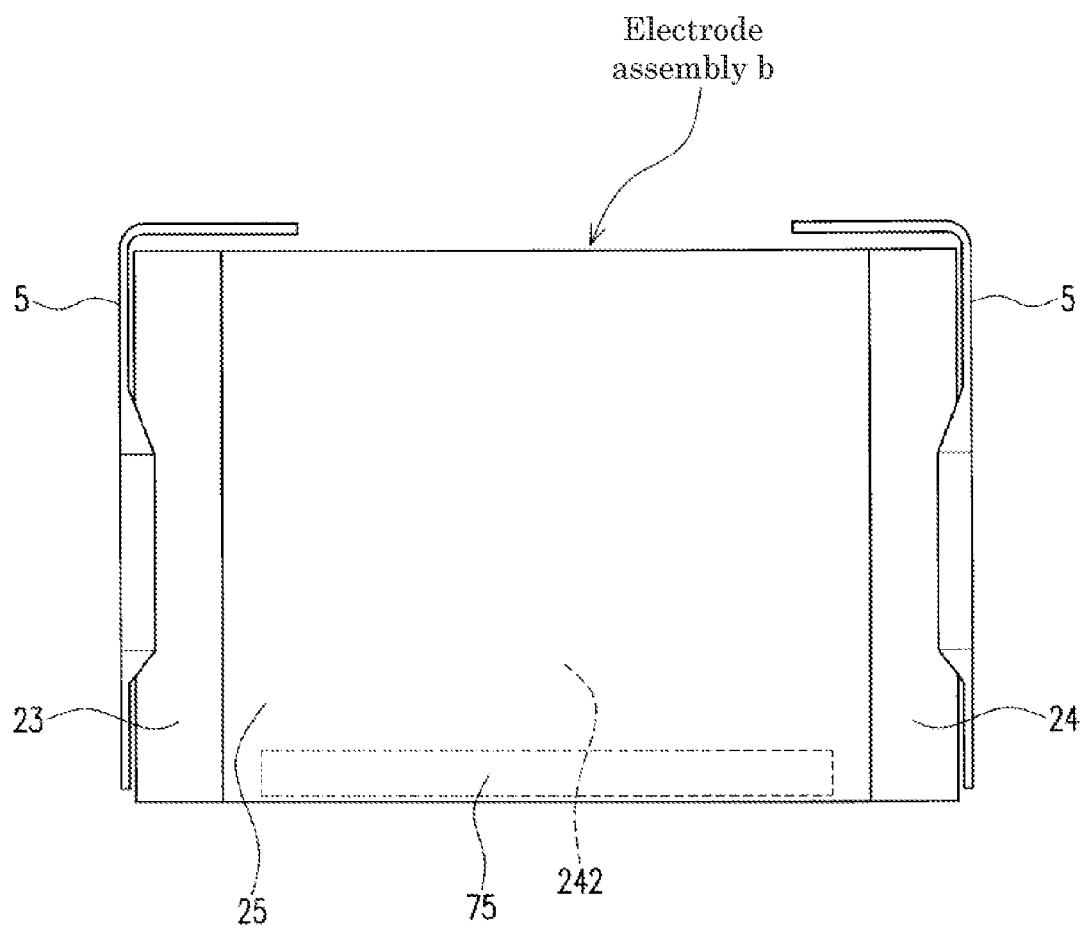
FIG. 12 is a diagram for explaining the positions of attaching the Li pieces in Example 2.

(1) in this experiment, in the case of an electrode assembly a, as shown in FIGS. 10 and 11, Li pieces 75 of 3 mm in thickness are attached to three sites of a current collector 5 connected to the electrode assembly a, and in the case of an electrode assembly b, as shown in FIG. 12, a Li piece 75 of 3 mm in thickness is attached onto a negative active material layer 242, and the outside thereof is surrounded by a separator 25.

(2) These electrode assemblies a and b are put in a transparent resin bag, an electrolyte solution is injected into the resin bag until the electrode assemblies a and b are immersed, and the resin bag is then sealed. In this case, the electrode assemblies a and b have contact with the free electrolyte solution (the electrolytic solution other than the electrolyte solution soaking into the electrode assemblies a and b in the resin bag).

(3) After the sealing, the disappearance of the Li pieces is visually observed.

<Experimental Results>

(1) Electrode assembly a 3 days after the electrolyte solution filling: the Li pieces were reduced at a visually unrecognized level.

Figure 13:
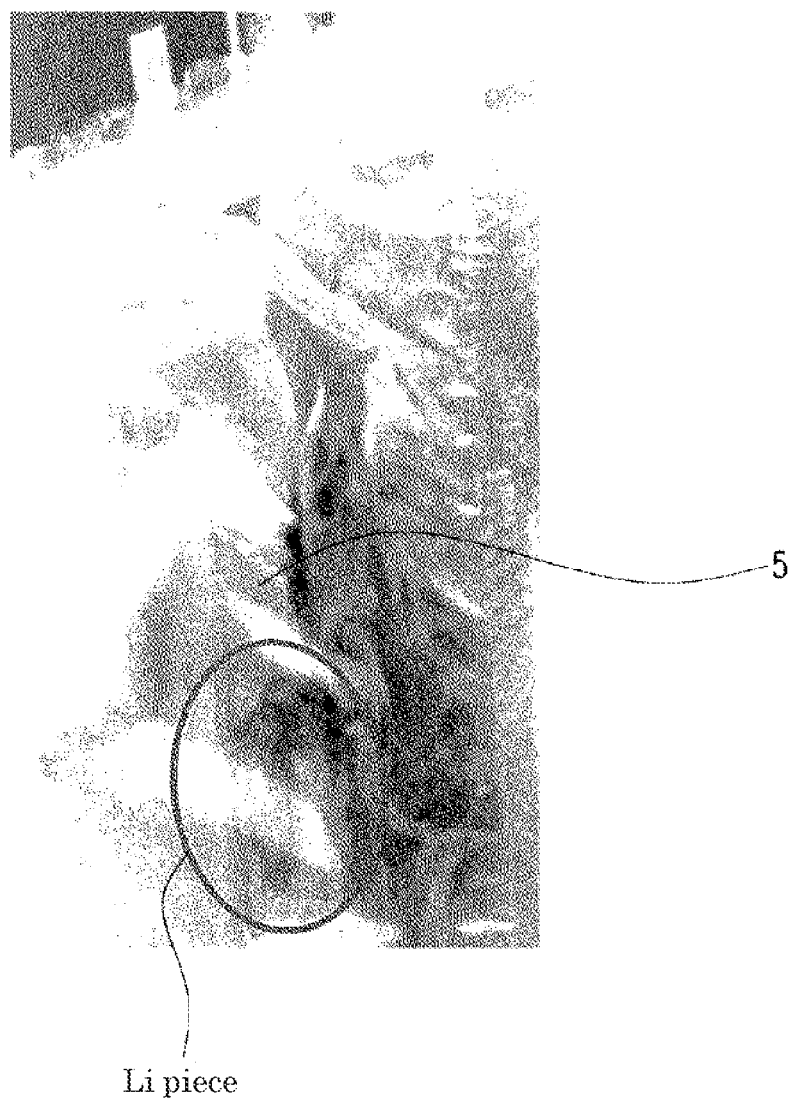
FIG. 13 is a photograph showing the condition of the Li piece 9 days after electrolyte solution filling in Example 2.

9 days after the electrolyte solution filling: as shown in the photograph of FIG. 13, the reduction of the Li pieces was successfully confirmed.

Figure 14:
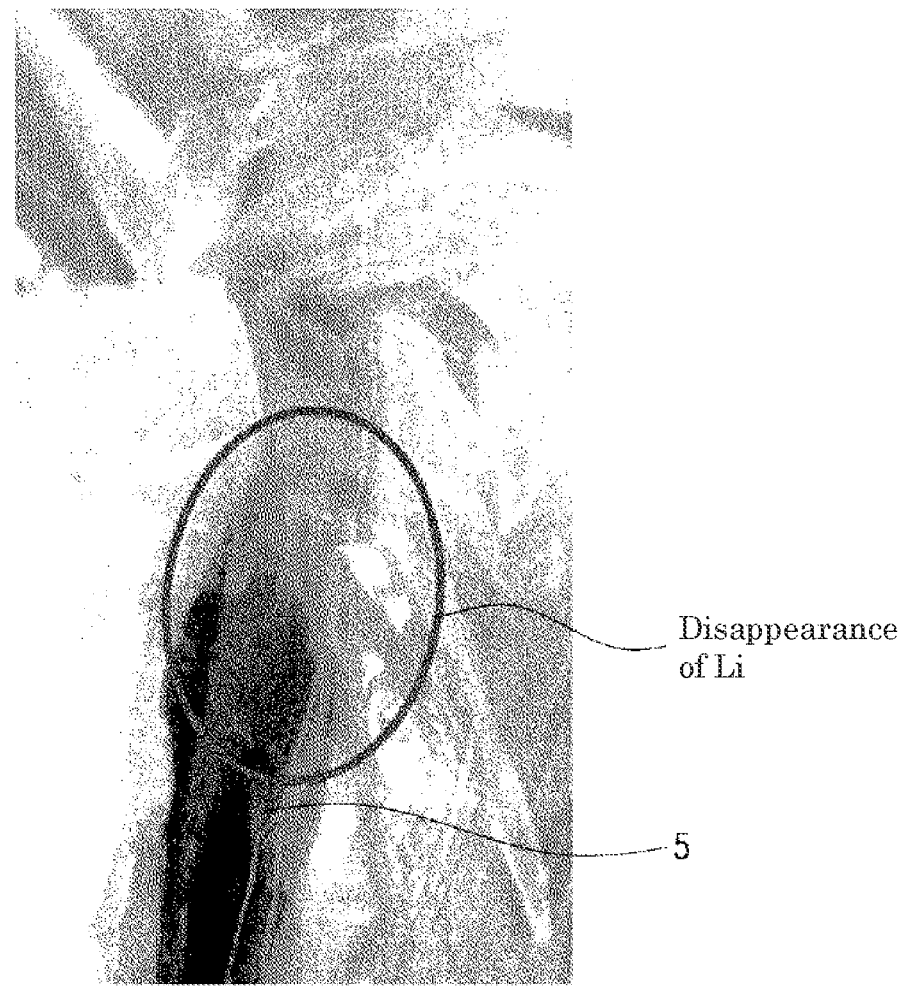
FIG. 14 is a photograph showing the condition of the Li piece 13 days after the electrolyte solution filling in Example 2.

13 days after the electrolyte solution filling: the Li piece attached to the site surrounded by the circle in the photograph of FIG. 14 completely reacted and disappeared.

(2) Electrode assembly b

The Li pieces left at the time of 13 days after the electrolyte solution filling were successfully confirmed.

From the foregoing two experimental results, it has been successfully confirmed that the precharge proceeds favorably in the case where the fact that "the Li metal layer is immersed in the free electrolyte solution" is combined with the fact that "the Li metal layer is joined to the current collecting member joined to the metal foil of the negative electrode (that is, the Li metal layer has electrical conduction to the negative electrode via a conductive member other than the active material layer)".

It is to be noted that the method for manufacturing the energy storage device according to the present invention is not to be considered limited to the embodiment mentioned above, and various changes can be obviously made without departing from the scope of the present invention. For example, the configuration of one embodiment can be added to the configuration of another embodiment, and the configuration of one embodiment can be partially replaced with the configuration of another embodiment. Furthermore, the configuration of one embodiment can be partially deleted.

In the energy storage device 1 manufactured by the manufacturing method according to the embodiment mentioned above, the metal constituting the metal layer 72 of the ion supply member 7 is Li, but not limited to this constituent. More specifically, the metal constituting the metal layer 72 is not limited to the metal contained in the negative active material layer 242. The metal constituting the metal layer 72 may be an alkali metal or an alkaline earth metal that is not contained in the negative active material layer 242, as long as, when the metal is released as metal ions into the electrolyte solution, the metal is stored by the negative active material layer 242 to eliminate or reduce the irreversible capacity in the energy storage device 1.

In addition, the specific structure of the alkali metal or alkaline earth metal disposed on the conductive member 71 is also not limited. More specifically, there is no need for the alkali metal or the alkaline earth metal to have the form of a sheet (foil) like the metal layer 72 according to the embodiment mentioned above. For example, in the case where the conductive member 71 is composed of a porous body, the porous body may have pores filled with the alkali metal or the alkaline earth metal. More specifically the alkali metal or the alkaline earth metal has only to be disposed on the conductive member 71 to have electrical conduction to the electrodes 23 and 24.

In the energy storage device 1 manufactured by the manufacturing method according to the embodiment mentioned above, the conductive member (the sheet in the example of the embodiment mentioned above) 71 of the ion supply member 7 has electrical conduction to the negative electrode 24, but the conductive member 71 is not limited to this configuration. The conductive member 71 may have electrical conduction to the positive electrode 23. More specifically, the conductive member 71 has only to be configured such that the alkali metal or alkaline earth metal (the metal layer 72 in the example of the embodiment mentioned above) disposed on the conductive member 71 has electrical conduction to the electrode (positive electrode 23 or negative electrode 24).

In the energy storage device 1 manufactured by the manufacturing method according to the embodiment mentioned above, the specific configuration of the conductive member 71 is not limited. For example, the conductive member 71 according to the embodiment mentioned above, which has the form of a sheet, may be composed of a case 3 that has electrical conduction to the electrodes 23 and 24. In this case, the metal layer 72 is disposed on the inner surface of the case 3, and the ion supply member 7 is composed of the metal layer 72 and the case 3. Alternatively, the conductive member 71 may lie composed of a current collector 5 that connects the electrode assembly 2 and the external terminal 4. In this case, the metal layer 72 is disposed on the current collector 5, and the ion supply member 7 is composed of the metal layer 72 and the current collector 5. More specifically, the conductive member 71 has only to be configured such that the metal layer 72 has electrical conduction to the electrodes 23 and 24.

In the energy storage device 1 manufactured by the manufacturing method according to the embodiment mentioned above, the conductive member 71 is conductively connected to the uncoated part of the negative electrode 24, but is not limited to this configuration. The conductive member 71 has only to be connected to any of the members so as to have electrical conduction to the electrodes 23 and 24 in the case 3.

In the energy storage device 1 manufactured by the manufacturing method according to the embodiment mentioned above, the ion supply member 7 has the stacked part 73 and the non-stacked part 74, but the ion supply member 7 is not limited to this configuration. For example, the ion supply member 7 may have only the stacked part 73. In this case, the surface of the conductive member (sheet) 71 opposite to the surface with the metal layer 72 stacked is conductively connected to the electrodes 23, 24, and the like. Further, for the ion supply member 7 including the stacked 73 and the non-stacked part 74, the surface of the sheet 71 opposite to the surface with the metal layer 72 stacked at the site constituting the stacked part 73 may be conductively connected to the electrodes 23, 24, and the like.

In the energy storage device 1 manufactured by the manufacturing method according to the embodiment mentioned above, the conductive member 71 of the ion supply member 7 is a copper foil, but is not limited to this constituent. The conductive member 71 has only to be composed of a material that has electrical conductivity and resistance to the electrolyte solution. Furthermore, the shape (contour) of the conductive member (sheet) 71 is not limited to the rectangular shape, and various shapes can be selected.

In the energy storage device 1 manufactured by the manufacturing method according to the embodiment mentioned above, the ion supply member 7 (specifically, the stacked part 73) is disposed between the separators 25, but the invention is not limited to this configuration. There is no need for the separator 25 to be provided outside the ion supply member 7. Furthermore, the ion supply member 7 (stacked part 73) may be directly opposed to the negative active material layer 242 without the separator 25 interposed therebetween.

Furthermore, the position of the ion supply member 7 disposed is not limited to the outside of the outermost peripheral site 24A of the negative electrode 24. The ion supply member 7 may be disposed at an intermediate position (for example, between the positive electrode 23 and the negative electrode 24) of the electrode assembly 2 in the stacking direction. In this case, the ion supply member 7 is connected to the negative electrode 24 by the non-stacked part 74, and insulated from the positive electrode 23 by the separator 25 or the like.

In the method for manufacturing the energy storage device 1 according to the embodiment mentioned above, the amount of the electrolyte solution injected into the case 3 is an amount such that the metal layer 72 of the ion supply member 7 is at least partially immersed in the free electrolyte solution and such that the liquid level of the free electrolyte solution is located at a position that is not lower than the lower end 24B of the innermost peripheral surface 24S at the electrode 24 of the electrode assembly 2, with the energy storage device 1 disposed such that the winding axis C is horizontal or substantially horizontal (orthogonal or substantially orthogonal to the direction of gravity), but the invention is not limited to this configuration.

The amount of the electrolyte solution injected into the case 3 may be an amount such that the electrode 24 constituting each layer of the stack in the electrode assembly 2 with the electrodes 24 staked (for example, a sheeted electrode in the stacked-type electrode assembly), or each of the electrode sites (for example, the sites of the electrode 24 constituting each layer in the wound-type electrode assembly 2) at least partially has contact with the free electrolyte solution. For example, the amount of the electrolyte solution injected into the case 3 may be an amount such that the metal layer 72 of the ion supply member 7 is at least partially immersed in the free electrolyte solution and such that the liquid level of the free electrolyte solution is located at a position that is not lower than the lower end of the electrode 24 constituting each layer in the so-called wound-type electrode assembly 2 (that is, the lower ends of all of the layers are immersed in the free electrolyte solution), with the energy storage device 1 disposed such that the winding axis C is vertical or substantially vertical (identical or substantially identical to the direction of gravity). In accordance with this configuration, the energy storage device 1 is disposed such that the winding axis C is vertical or substantially vertical (identical or substantially identical to the direction of gravity), thereby supplying the alkali metal or alkaline earth metal (metal ions) dissolved in the free electrolyte solution from the ion supply member 7 to each layer of the electrode assembly 2 (the entire area of the electrode 24 in the longitudinal direction) through the free electrolyte solution, and thus efficiently precharging the electrodes 24. More specifically, as compared with the case where metal ions obtained by precharge move (diffuse) through the negative active material layer 242 or move through the electrolyte solution that has soaked into the separator 25, the movement through the free electrolyte solution makes it possible to remarkably shorten the distance of the metal ions released from the ion supply member 7 disposed on the outer periphery of the electrode assembly 2 to reaching the winding center of the electrode assembly 2, thereby allowing metal ions to be quickly supplied to the winding center of the wound-type electrode assembly 2.

The electrode assembly 2 of the energy storage device 1 according to the embodiment mentioned above is a so-called wound-type electrode assembly, but is not limited to this configuration. For example, the electrode assembly 2 may be a so-called stacked-type (stack-type) electrode assembly that has sheeted electrodes (positive electrode, negative electrode) stacked in the thickness direction of the respective electrodes. In this case, the amount of the electrolyte solution injected into the case 3 is preferably an amount such that the metal layer 72 of the ion supply member 7 is at least partially immersed in the free electrolyte solution and such that the liquid level of the free electrolyte solution is located at a position that is not lower than the lower end of each electrode (negative electrode) in the so-called stacked-type electrode assembly (that is, the lower ends of all of the electrodes (negative electrodes) are immersed in the free electrolyte solution), with the energy storage device disposed such that the direction of stacking the electrodes (positive electrode, negative electrode) in the electrode assembly is horizontal or substantially horizontal (orthogonal or substantially orthogonal to the direction of gravity). In accordance with this configuration, the energy storage device is disposed such that the direction of stacking the electrodes is horizontal or substantially horizontal, thereby supplying the alkali metal or alkaline earth metal (metal ions) dissolved in the free electrolyte solution from the ion supply member 7 to each electrode (negative electrode) of the electrode assembly through the free electrolyte solution, and thus efficiently precharging the electrodes.

Furthermore, in the electrode assembly 2, at least one of the positive electrode 23 and the negative electrode 24 may be folded in a zigzag manner (folded in an accordion form).

Furthermore, in the method for manufacturing the energy storage device 1 according to the embodiment mentioned above, the specific location of the ion supply member 7 disposed in the electrode assembly 2 is not limited. The ion supply member 7 according to the embodiment is disposed at the lower curved site of the electrode assembly 2, but may be disposed at the upper (opposite to the curved site mentioned previously) curved site, and may be disposed in a flat site (for example, a site between the upper and lower curved sites in FIGS. 2 and 4) of the electrode assembly 2.

In the method for manufacturing the energy storage device 1 according to the embodiment mentioned above, the formation of the electrode assembly 2 and the attachment of the ion supply member 7 to the electrode assembly 2 are performed at the same time (in the same step), but the configuration is not limited to this organization. The ion supply member 7 may be attached to the electrode assembly 2 after the electrode assembly 2 is completed, that is, the step of forming the electrode assembly 2 and the step of attaching the ion supply member 7 to the electrode assembly 2 may be separated.

In the energy storage device 1 manufactured by the manufacturing method according to the embodiment mentioned above, the electrolyte solution filling hole 320 is provided in the lid plate 32, but may be provided in the case body 31.

According to the technique disclosed herein, the energy storage device (for example, the energy storage device before precharge) 1 is provided, which includes the electrode assembly 2 including the positive electrode 23 and the negative electrode 24, the predetermined amount of the electrolyte solution, the case 3 the houses the electrode assembly 2 and the predetermined amount of the electrolyte solution, the ion supply member 7 disposed in the case 3. The ion supply member 7 of the energy storage device 1 has the conductive member 71, and the metal layer 72 containing an alkali metal or an alkaline earth metal, disposed on the conductive member 71. The conductive member 71 has electrical conduction to the negative electrode 24. The electrolyte solution includes the free electrolyte solution remaining without soaking into the electrode assembly 2 in the case 3. In this regard, the predetermined amount is an amount such that the metal layer 73 at least partially comes into contact with the free electrolyte solution.

In a preferable aspect, the electrode assembly 2 has the separator 25 disposed between the positive electrode 23 and the negative electrode 24. The negative electrode 24 has the conductive foil 241 and the negative active material layer 242 laminated on the foil 241. The ion supply member 7 has the stacked part 73 with the metal layer 72 stacked, and the non-stacked part 74 without the metal layer 72 stacked. The non-stacked part 73 of the ion supply member 7 has electrical conduction to the foil 241 of the negative electrode 24, with the metal layer 72 opposed to the negative active material layer 242 with the separator 25 interposed therebetween.

In a preferable aspect, for the electrode assembly 2, the positive electrode 23 and the negative electrode 24 are wound with the separator 25 interposed therebetween. The separator 25 is wound and stacked at the outermost periphery of the electrode assembly 2. The ion supply member 7 has the staked part 73 disposed between the separators 25 wound and stacked at the outermost periphery of the electrode assembly 2.

In a preferable aspect, the negative active material layer 242 is laminated on the both sides of the foil 241 of the negative electrode 24. For the electrode assembly 2, the outermost peripheral site 24A of the negative electrode 24 is disposed outside the outermost peripheral site of the positive electrode 23.

In a preferable aspect, the ion supply member 7 is disposed at the curved site of the electrode assembly 2.

Furthermore, according to the technique disclosed herein, the energy storage device (for example, the energy storage device after precharge) 1 is provided, which includes the electrode assembly 2 including the positive electrode 23 and the negative electrode 24, the predetermined amount of the electrolyte solution, the case 3 the houses the electrode assembly 2 and the predetermined amount of the electrolyte solution, the conductive member 71 disposed in the case 3. The conductive member 71 of the energy storage device 1 has electrical conduction to the negative electrode 24. The electrolyte solution includes the free electrolyte solution remaining without soaking into the electrode assembly 2 in the case 3. In this regard, the predetermined amount is an amount such that the conductive member 71 at least partially comes into contact with the free electrolyte solution.

In a preferable aspect, the electrode assembly 2 has the separator 25 disposed between the positive electrode 23 and the negative electrode 24. The negative electrode 24 has the conductive foil 241 and the negative active material layer 242243 laminated on the foil 241. The conductive member 71 has a first site 73 and a second site 74. The second site 74 of the conductive member 71 has electrical conduction to the foil 241 of the negative electrode 24, with the first site 73 opposed to the negative active material layer 242 with the separator 25 interposed therebetween.

In a preferable aspect, for the electrode assembly 2, the positive electrode 23 and the negative electrode 24 are wound with the separator 25 interposed therebetween. The separator 25 is wound and stacked at the outermost periphery of the electrode assembly 2. The conductive member 71 has the first site 73 disposed between the separators 25 wound and stacked at the outermost periphery of the electrode assembly 2.

In a preferable aspect, the negative active material layer 242 is laminated on the both sides of the foil 241 of the negative electrode 24. For the electrode assembly 2, the outermost peripheral site 24A of the negative electrode 24 is disposed outside the outermost peripheral site of the positive electrode 23.

In a preferable aspect, the conductive member 71 is disposed at the curved site of the electrode assembly 2.

In addition, although the case where the energy storage device is used as a rechargeable nonaqueous electrolyte secondary battery (for example, a lithium ion secondary battery) has been described in the embodiment mentioned above, the type and size (capacity) of the energy storage device are arbitrary. Furthermore, although the lithium ion secondary battery has been described as an example of the energy storage device in the embodiment mentioned above, the present invention is not limited to this example. For example, the present invention can be applied to various secondary batteries, and additionally, primary batteries, and energy storage devices for capacitors such as electric double layer capacitors.

Figure 15:
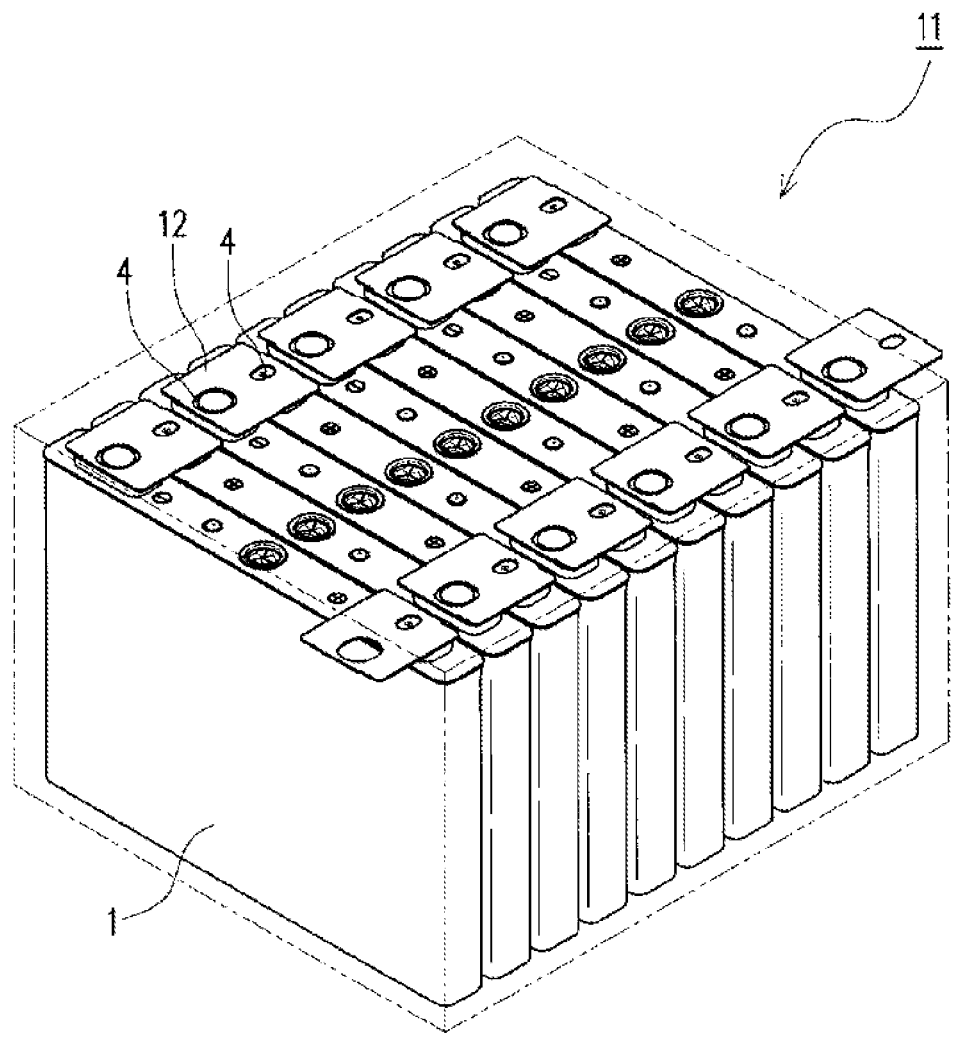
FIG. 15 is a perspective view of an energy storage apparatus including the energy storage device.
Figure 15:
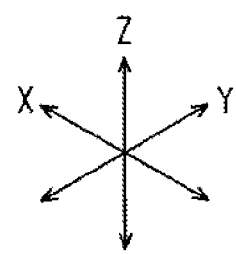
Figure 16:
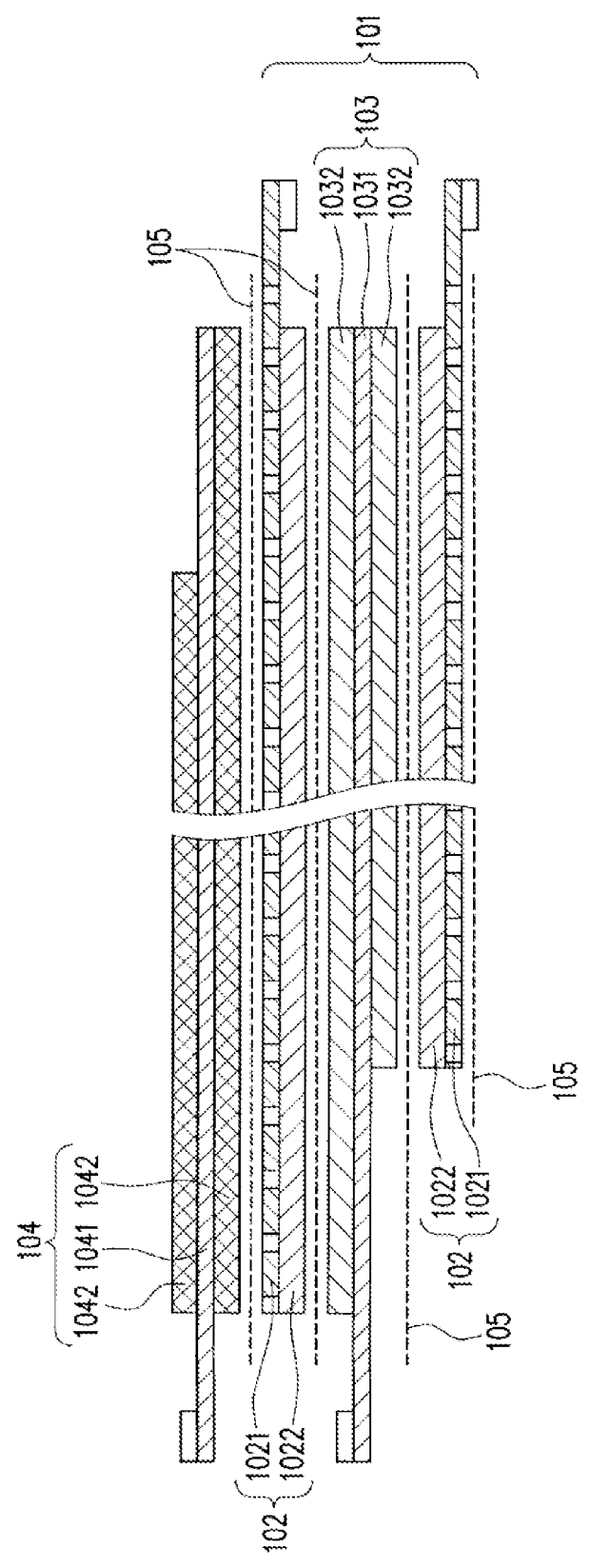
FIG. 16 is a schematic cross-sectional view of a conventional electrode sheet group.
Figure 17:
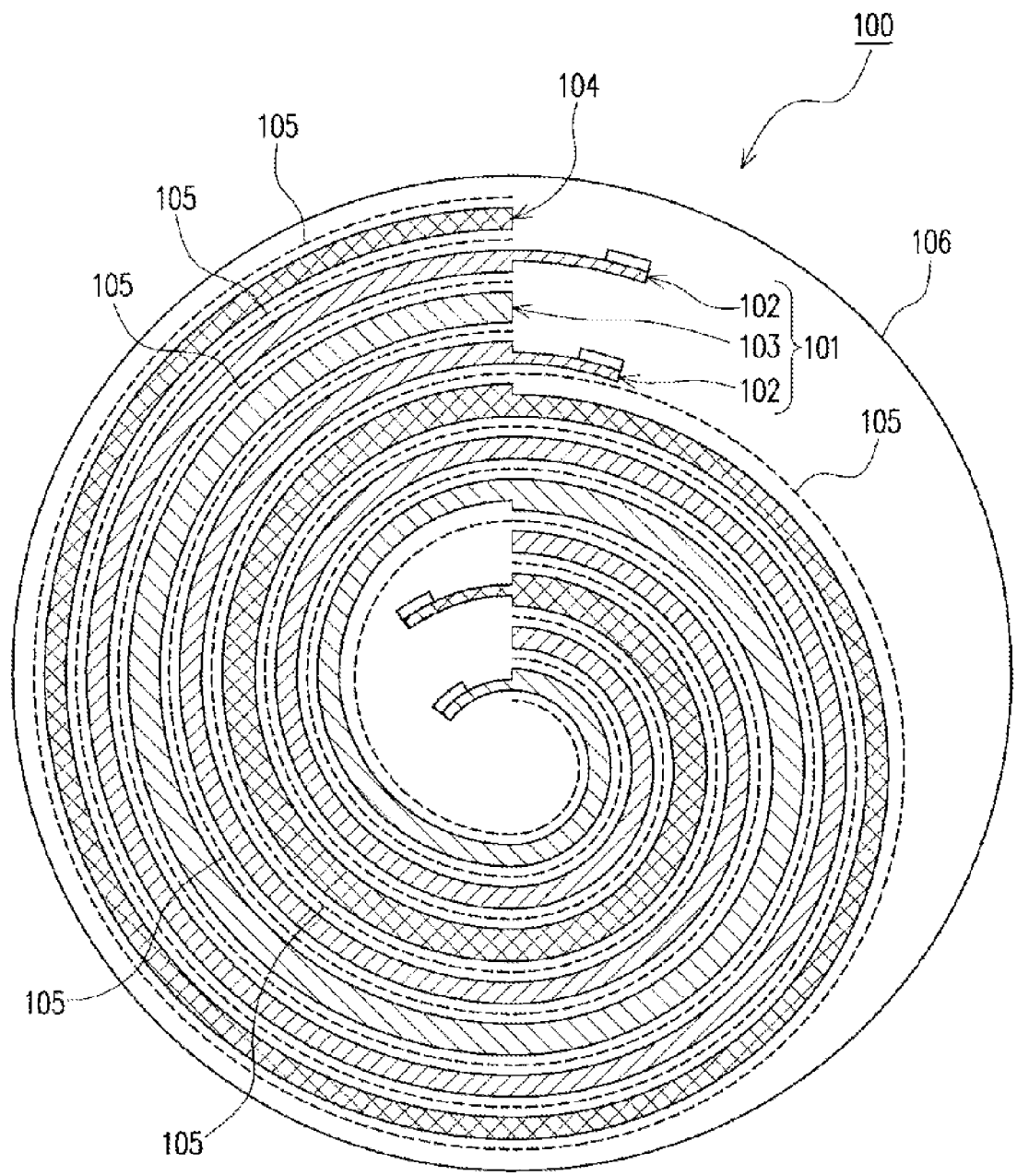
FIG. 17 is a schematic cross-sectional view of a conventional energy storage device.

The energy storage device (for example, a battery) 1 may be used for an energy storage apparatus (a battery module in the case where the energy storage device is a battery) 11 as shown in FIG. 15. The energy storage apparatus 11 includes at least two energy storage devices 1 and a bus bar member 12 that electrically connects two (different) energy storage devices 1 to each other. In this case, the technique of the present invention has only to be applied to at least one energy storage device 1.

DESCRIPTION OF REFERENCE SIGNS

1: Energy storage device
2: Electrode assembly
21: Winding core
22: Layered product
23: Positive electrode (electrode)
231: Metal foil (conductive foil)
232: Positive active material layer
24: Negative electrode (electrode)
241: Metal foil (conductive foil)
242: Negative active material layer
24A: Outermost peripheral site
24B: Lower end of innermost peripheral surface
24S: Innermost peripheral surface of wound electrode
25: Separator
26: Uncoated stacked part
261: Divided uncoated stacked part
27: Hollow
3: Case
31: Case body
310: Opening peripheral edge
311: Closed part
312: Body
313: Long wall
314: Short wall
32: Lid plate
320: Electrolyte solution filling hole
35: Electrolyte solution filling plug
351: Head
352: Insertion
4: External terminal
41: Surface
5: Current collector
50: Clip member
51: First connection
52: Second connection
6: Insulating member
7: Ion supply member
71: Sheet (conductive member)
72: Metal layer (alkali metal or alkaline earth metal)
73: Stacked part
74: Non-stacked part
75: Li piece
11: Energy storage apparatus
12: Bus bar member
100: Energy storage device
101: Electrode sheet group
102: Positive electrode sheet
1021: Positive electrode current collector
1022: Positive composite layer
103: Negative electrode sheet
1031: Negative electrode current collector
1032: Negative composite layer
104: Lithium electrode sheet
1041: Lithium electrode current collector
1042: Metallic lithium foil
105: Separator
106: Container
C: Winding shaft

The invention claimed is:

1. A method for manufacturing an energy storage device comprising an electrode assembly, an ion supply member, an electrolyte solution, and a case,
the method comprising injecting the electrolyte solution in a predetermined amount into the case,
wherein
the ion supply member comprises a conductive member and an alkali metal or an alkaline earth metal disposed on the conductive member,
the electrode assembly comprises stacked electrodes each having a strip shape and an active material layer, one of the stacked electrodes having electrical conduction to the conductive member of the ion supply member,
the predetermined amount is an amount such that the alkali metal or the alkaline earth metal of the ion supply member at least partially comes into contact with a free electrolyte solution that is the electrolyte solution excluding the electrolyte solution soaking into the electrode assembly in the case in a state in which the electrode assembly, the ion supply member and the electrolyte solution are housed in the case,
a total number of the ion supply member in the energy storage device is one,
the stacked electrodes are wound, and the electrode assembly comprises an upper curved site, a lower curved site and a flat site disposed between the upper curved site and the lower curved site,
the ion supply member is disposed only at the lower site, and
a dimension of the ion supply member in a direction of a winding axis of the stacked electrodes is smaller than a dimension of the active material layer of the stacked electrodes in the direction of the winding axis.

2. The method for manufacturing an energy storage device according to claim 1, wherein the ion supply member is disposed outside the outermost electrode of the electrode assembly in the stacking direction.

3. The method for manufacturing an energy storage device according to claim 1, the method comprising maintaining a state in which the free electrolyte solution is present in the case for a predetermined period of time, wherein
the electrode assembly at least partially has multiple electrodes stacked, and
the predetermined amount is an amount such that the multiple stacked electrodes constituting respective layers or sites of the electrodes each at least partially come into contact with the free electrolyte solution during the maintaining the state.

4. The method for manufacturing an energy storage device according to claim 1, wherein
the electrode assembly comprises a positive electrode and a negative electrode as the stacked electrodes, and a separator disposed between the positive electrode and the negative electrode,
the negative electrode comprises a conductive foil and a negative active material layer laminated on the conductive foil,
the ion supply member comprises the conductive member, and a metal layer containing the alkali metal or the alkaline earth metal, the metal layer disposed on the conductive member,
the ion supply member comprises a stacked part with the metal layer stacked, and a non-stacked part without the metal layer stacked, and
the non-stacked part of the ion supply member has electrical conduction to the conductive foil of the negative electrode, with the metal layer opposed to the negative active material layer with the separator interposed therebetween.

5. The method for manufacturing an energy storage device according to claim 4, wherein
the positive electrode and the negative electrode are wound with the separator interposed therebetween in the electrode assembly,
the separator is wound and stacked at the outermost periphery of the electrode assembly, and
the stacked part of the ion supply member is disposed between a first layer and a second layer of the separator wound and stacked at the outermost periphery of the electrode assembly.

6. The method for manufacturing an energy storage device according to claim 5, wherein
the negative active material layer is laminated on both sides of the conductive foil of the negative electrode, and
for the electrode assembly, the outermost peripheral site of the negative electrode is disposed outside the outermost peripheral site of the positive electrode.

7. The method for manufacturing an energy storage device according to claim 1, wherein
the ion supply member comprises the conductive member, and a metal layer containing the alkali metal or the alkaline earth metal, the metal layer disposed on the conductive member, and
the predetermined amount is an amount such that the whole metal layer of the ion supply member is immersed in the free electrolyte solution.

8. The method for manufacturing an energy storage device according to claim 1, wherein the predetermined amount is an amount such that a liquid level of the free electrolyte solution is located on or above a lower end of the innermost peripheral surface in the wound and stacked electrodes.

9. The method for manufacturing an energy storage device according to claim 1, wherein the predetermined amount is an amount such that a liquid level of the free electrolyte solution is located on or above a lower end of the innermost peripheral surface in the wound and stacked electrodes and lower than the winding axis.

10. The method for manufacturing an energy storage device according to claim 1, wherein the ion supply member is a continuous member.

11. An energy storage device comprising:
an electrode assembly comprising a positive electrode and a negative electrode, each having a strip shape;
a predetermined amount of electrolyte solution;
a case that houses the electrode assembly and the predetermined amount of the electrolyte solution; and
an ion supply member disposed in the case,
wherein
the ion supply member has a conductive member and a metal layer containing an alkali metal or an alkaline earth metal, the metal layer disposed on the conductive member,
the conductive member has electrical conduction to the negative electrode,
the electrolyte solution comprises a free electrolyte solution remaining without soaking into the electrode assembly in the case, and
the predetermined amount is an amount such that the metal layer at least partially comes into contact with the free electrolyte solution,
a total number of the ion supply member in the energy storage device is one,
the positive electrode and the negative electrode are wound, and the electrode assembly comprises an upper curved site, a lower curved site and a flat site disposed between the upper curved site and the lower curved site,
the ion supply member is disposed only at the lower site, and
a dimension of the ion supply member in a direction of a winding axis of the positive electrode and the negative electrode is smaller than a dimension of active material layers of the positive electrode and the negative electrode in the direction of the winding axis.

12. The energy storage device according to claim 11, wherein
the electrode assembly comprises a separator disposed between the positive electrode and the negative electrode,
the negative electrode comprises a conductive foil and a negative active material layer laminated on the conductive foil,
the ion supply member comprises a stacked part with the metal layer stacked and a non-stacked part without the metal layer stacked, and
the non-stacked part of the ion supply member has electrical conduction to the conductive foil of the negative electrode, with the metal layer opposed to the negative active material layer with the separator interposed therebetween.

13. The energy storage device according to claim 12, wherein
the positive electrode and the negative electrode are wound with the separator interposed therebetween in the electrode assembly,
the separator is wound and stacked at the outermost periphery of the electrode assembly, and
the stacked part of the ion supply member is disposed between a first layer and a second layer of the separator wound and stacked at the outermost periphery of the electrode assembly.

14. The energy storage device according to claim 13, wherein
- the negative active material layer is laminated on both sides of the conductive foil of the negative electrode, and
- for the electrode assembly, the outermost peripheral site of the negative electrode is disposed outside the outermost peripheral site of the positive electrode.

\* \* \* \* \*